United States Patent [19]
Takano et al.

[11] Patent Number: 5,926,456
[45] Date of Patent: *Jul. 20, 1999

[54] PATH CHANGING SYSTEM AND METHOD FOR USE IN ATM COMMUNICATION APPARATUS

[75] Inventors: Masataka Takano; Yoji Oka, both of Yokohama; Akihiko Takase, Tokyo; Setsuo Takahashi, Yokohama, all of Japan

[73] Assignee: Hitachi, Ltd., Tokyo, Japan

[ * ] Notice: This patent is subject to a terminal disclaimer.

[21] Appl. No.: 08/744,630

[22] Filed: Nov. 6, 1996

Related U.S. Application Data

[63] Continuation of application No. 08/296,334, Aug. 25, 1994., Pat. No. 5,600,630

[30] Foreign Application Priority Data

Aug. 31, 1993 [JP] Japan ..................................... 5-215485

[51] Int. Cl.⁶ .............................. H04J 3/14; H04L 12/56
[52] U.S. Cl. ............................................ 370/218; 370/397
[58] Field of Search .................................... 370/218, 219, 370/220, 225, 227, 228, 395, 396, 397, 398, 399, 400, 408, 409

[56] References Cited

U.S. PATENT DOCUMENTS

| | | |
|---|---|---|
| Re. 34,305 | 7/1993 | Sakurai et al. . |
| 4,884,263 | 11/1989 | Suzuki . |
| 5,016,243 | 5/1991 | Fite, Jr. . |
| 5,084,867 | 1/1992 | Tachibana et al. . |
| 5,093,824 | 3/1992 | Coan et al. . |
| 5,239,537 | 8/1993 | Sakauchi . |
| 5,241,534 | 8/1993 | Omuro et al. . |
| 5,253,248 | 10/1993 | Dravida et al. .......................... 370/228 |
| 5,295,134 | 3/1994 | Yoshimura et al. . |
| 5,301,184 | 4/1994 | Uriu et al. . |
| 5,412,376 | 5/1995 | Chujo et al. ............................. 370/397 |
| 5,600,630 | 2/1997 | Takano et al. .......................... 370/218 |

FOREIGN PATENT DOCUMENTS

| | | |
|---|---|---|
| 2063311 | 9/1992 | Canada . |
| 2-001669 | 1/1990 | Japan . |
| 2-090834 | 3/1990 | Japan . |
| 2-203438 | 3/1992 | Japan . |
| 4-156139 | 5/1992 | Japan . |
| 05003489 | 1/1993 | Japan . |
| 5-003489 | 1/1993 | Japan . |
| 05183566 | 7/1993 | Japan . |

OTHER PUBLICATIONS

NEC Technical Report, Mar., 1990, pp. 9–15. Provided in Japanese and English.

*Primary Examiner*—Chi H. Pham
*Assistant Examiner*—Steven Nguyen
*Attorney, Agent, or Firm*—Fay, Sharpe, Beall, Fagan, Minnich & McKee

[57] ABSTRACT

An ATM path changing system and method for use in an ATM communication apparatus and ATM communication network are provided which can set an alternating route in the event of a failure occurring in a transmission line or VP. A header converter in a line controller includes a plurality of output path routing tables, a selector, a comparator, a register for failure RTG and a register for failure VPI and when the contents of the register for failure RTG or VPI coincides with a RTG or VPI of the output path routing tables, an output is selected in accordance with the contents of a selected emergency-route RTG or VPI register.

16 Claims, 21 Drawing Sheets

FIG. 13A

| ADDRESS | DATA | | |
|---|---|---|---|
| 0 | RTG2 | VPI21 | --- |
| ... | ... | ... | |
| n | RTGn | VPImm | --- |

| ADDRESS | DATA | | |
|---|---|---|---|
| 0 | RTG3 | VPI31 | --- |
| ... | ... | ... | |
| n | RTGx | VPIyy | --- |

| ADDRESS | DATA | | |
|---|---|---|---|
| 0 | $RTG_2$ | $VPI_{21}$ | --- |
| ⋮ | ⋮ | | |
| n | $RTG_n$ | $VPI_{mm}$ | --- |
| n+1 | $RTG_3$ | $VPI_{31}$ | --- |
| ⋮ | ⋮ | | |
| n+n | $RTG_x$ | $VPI_{yy}$ | --- |

ATM COMMUNICATION APPARATUS A

| ADDRESS | RTG | VPI |
|---|---|---|
| 0 | | |
| 1 | B | 4 |
| 2 | B | 5 |
| 3 | D | 6 |
| ---- | | |
| 255 | | |

FIRST ROUTING TABLE

FIG. 19B

| ADDRESS | RTG | VPI |
|---|---|---|
| 0 | | |
| 1 | | |
| 2 | B | 10 |
| 3 | | |
| ---------- | | |
| 255 | | |

SECOND ROUTING TABLE

FIG. 19C

ATM COMMUNICATION APPARATUS B

| ADDRESS | RTG | VPI |
|---|---|---|
| 0 | | |
| ---- | | |
| 4 | C | 8 |
| 5 | E | 20 |
| ---- | | |
| 10 | C | 8 |
| ----- | | |
| 255 | | |

FIG. 19D

| ADDRESS | RTG | VPI |
|---|---|---|
| 0 | | |
| ----- | | |
| 4 | D | 7 |
| ---------- | | |
| 255 | | |

FIG. 19E

ATM COMMUNICATION APPARATUS D

| ADDRESS | RTG | VPI |
|---|---|---|
| 0 | | |
| ----- | | |
| 6 | F | 21 |
| 7 | C | 9 |
| -------- | | |
| 255 | | |

FIG. 19F

| ADDRESS | RTG | VPI |
|---|---|---|
| 0 | | |
| -------------- | | |
| 255 | | |

| 1ST OCTET | VPI | |
|---|---|---|
| 2ND OCTET | VPI | VCI |
| 3RD OCTET | VCI | |
| 4TH OCTET | VCI | |
| 5TH OCTET | | |
| 6TH OCTET | PAYLOAD | |
| ⋮ | ⋮ | |
| 53RD OCTET | PAYLOAD | |

| 1ST OCTET | RTG | |
|---|---|---|
| 2ND OCTET | VPI | |
| 3RD OCTET | VPI | VCI |
| 4TH OCTET | VCI | |
| 5TH OCTET | VCI | |
| 6TH OCTET | | |
| 7TH OCTET | PAYLOAD | |
| ⋮ | ⋮ | |
| 54TH OCTET | PAYLOAD | |

5,926,456

PATH CHANGING SYSTEM AND METHOD FOR USE IN ATM COMMUNICATION APPARATUS

This application is a continuation of Ser. No. 08/296,334 filed Aug. 25, 1994 U.S. Pat. No. 5,600,630.

BACKGROUND OF THE INVENTION

The present invention relates to setting an alternating route (detour) in an ATM communication apparatus which realizes the function of multiplexing or switching and more particularly to ATM path changing method and system for realization of changing a transmission path or a virtual path (hereinafter referred to as VP) at a high speed.

In a conventional ATM communication network, for the sake of changing a transmission line or a VP, a method is employed as described in JP-A-2-90834, according to which an information table is retrieved on the basis of information of a cell header, an output (or outgoing) transmission line or path is selected and the function of concentration or cross-connect is realized; and besides the output transmission line or path is changed by causing the central processing unit to rewrite the information table and thereafter retrieve the renewed table. A method for change of transmission line is described in NEC Technical Report (March 1990, pp.9–15), according to which an emergency transmission line is provided and in the event that a failure occurs in a normal route, changing to the transmission line of an emergency route is effected after detection of the failure by means of a switch included in the system.

Further, U.S. Pat. No. 5,093,824 discloses a method in which in the event of the occurrence of a failure, a node detecting this failure prepares a message, the message is transmitted from one node to another to flood the network with the message so as to inform each node of a network topology, whereby the individual nodes are allowed to have in common a correct state which makes the precedently owned network topology coincident with each other so as to reconstruct the connection of the network, thereby avoiding the failure.

JP-A-4-88738, JP-A-4-156139 and JP-A-5-3489 disclose alternating (detouring) operations.

SUMMARY OF THE INVENTION

The conventional hot-stand-by method as above always needed the emergency transmission line to improve the reliability and was not economical. Also, when the transmission line is not made to be duplex, the output (or outgoing) routing table must be rewritten such that header information of a fixed-length packet is rewritten so as to deliver the fixed-length packet to an output alternating transmission line or path. Accordingly, when the communication network is managed centrally by a network management center (NMC), the output routing table of very large capacity which is included in an ATM communication apparatus of interest must be rewritten after transmission line or path failure information has been recognized by the NMC and much time is taken for this to proceed, raising a problem that the time for interrupting communication is prolonged. Even if the central processing unit included in the ATM communication apparatus and operative to detect a transmission line or path failure performs a processing for determining a transmission line to be changed after recognition of the failure and resetting the output routing table of very large capacity included in the apparatus, the path is interrupted for the time taken for the output routing table to be rewritten and disadvantageously highly reliable services cannot be offered.

Further, in the method shown in U.S. Pat. No. 5,093,824, a failure state is transmitted from one node to another and disadvantageously the time taken for the network to be reconstructed is prolonged.

A first object of the present invention is to provide high-speed and economically constructed ATM path changing method and system which can realize changing to an alternating transmission line within a short period of time in the event of a failure occurring in a transmission line by eliminating the necessity of rewrite of the output (or outgoing) routing table and minimizing a processing carried out through the central processing unit or the NMC.

A second object of the present invention is to provide high-speed and economically constructed ATM path changing method and system which can realize changing to an alternating path within a short period of time in the event of the occurrence of failure in a path.

A third object of the present invention is to provide high-speed and economically constructed ATM path changing method and system which can realize changing to an alternating transmission line or path even in the event of a failure occurring in a transmission line or a path.

A fourth object of the present invention is to provide high-speed and economically constructed ATM path changing method and system which can realize changing to an alternating transmission line or path even in the event of a failure occurring in a transmission line or a path without resort to the provision of a plurality of failure information registers.

A fifth object of the present invention is to provide high-speed and economically constructed ATM path changing method and system which can realize changing to alternating transmission lines or paths even in the event of failures occurring in a plurality of transmission lines or paths.

A sixth object of the present invention is to provide high-speed and economically constructed ATM path changing method and system which can realize changing to alternating transmission lines or paths even in the event of failures occurring in a plurality of transmission lines or paths without resort to the provision of a plurality of output routing tables.

A seventh object of the present invention is to provide high-speed and economically constructed communication network changing method and system which can realize communication in a communication network, comprised of a plurality of communication apparatus, a managing apparatus for managing the plurality of communication apparatus and transmission lines, in the event of a failure occurring in a transmission line or a path by taking an alternating transmission line or path.

The above first object can be accomplished by providing, in a header converter, a plurality of routing tables, a register for failure RTG adapted to set failure internal routing information RTG of system, a comparator for comparing the contents of the register for failure RTG with the internal routing information of system indicative of transmission line routing information and a selector for selecting the contents of one of the first and second routing tables, by setting a RTG corresponding to a failure transmission line in the event of the occurrence of a failure in the transmission line in the register for failure RTG, and by replacing an output (or outgoing) cell header with the contents of the second routing table when the set RTG coincides with a RTG contained in the contents of the internal routing information of system of the first routing table.

The above second object can be accomplished by replacing the register for failure RTG with a register for failure path and similarly replacing the output header with the contents of the second routing table when the set path coincides with a path of the first routing table.

The above third object can be accomplished by providing a register for failure RTG and a register for failure path separately, providing comparators and selectors in association with the individual registers and similarly replacing the output cell header with the contents of the second routing register when the set RTG or path coincides with a RTG or path of the first routing table.

The above fourth object can be accomplished by making the register for failure RTG settable also with a failure path and similarly replacing the output header with the contents of the second routing register when the set path coincides with a path of the first routing table.

The above fifth object can be accomplished by providing a plurality of registers for failure RTG and for failure path in the form of a table or by providing a common register for setting failure RTG and failure path and having an identification bit for effecting a changing of a transmission line or a path.

The above sixth object can be accomplished by providing the first and second routing tables in the same memory and performing reading of the memory twice.

The above seventh object can be accomplished by constructing a communication network by a plurality of communication apparatus which can achieve any one of the above first to sixth objects, a management apparatus for managing the plurality of communication apparatus and transmission lines.

Since a plurality of routing tables and a table for failure RTG or for failure VP are provided in a header converter and the function of consulting an output path routing table for changing path is obtained by setting a failure RTG or failure VP, the central processing unit is required in the event of the occurrence of a failure to perform only the processing of recognition of failure information and setting of the failure information in the table for failure RTG or failure VP is not required to reset all of the output routing tables in the line controller which set a failure path in the output, thus realizing shortening of the path changing time. Also, since the network management apparatus sets a routing table in each ATM communication apparatus in advance, there is no need of resetting the routing tables of all of the ATM communication apparatus which designate a failure transmission line or VP to the output route in the event of a failure in the transmission line or VP. In other words, a large amount of table information need not be transferred from the network managing apparatus and therefore shortening of the path changing time can be realized.

BRIEF DESCRIPTION OF THE DRAWINGS

FIGS. 13A and 13B are diagrams showing memory maps of routing tables in the FIG. 11 circuit.

FIG. 14 is a diagram showing a memory map of a routing table in the FIG. 12 circuit.

FIGS. 19A to 19F are diagrams showing memory maps of header converter tables in the individual ATM communication apparatus of FIG. 18.

DESCRIPTION OF THE PREFERRED EMBODIMENTS

Before describing path changing system and method according to the present invention in detail, the construction of an ATM communication apparatus presupposed by the present invention will first be described.

Figure 20:
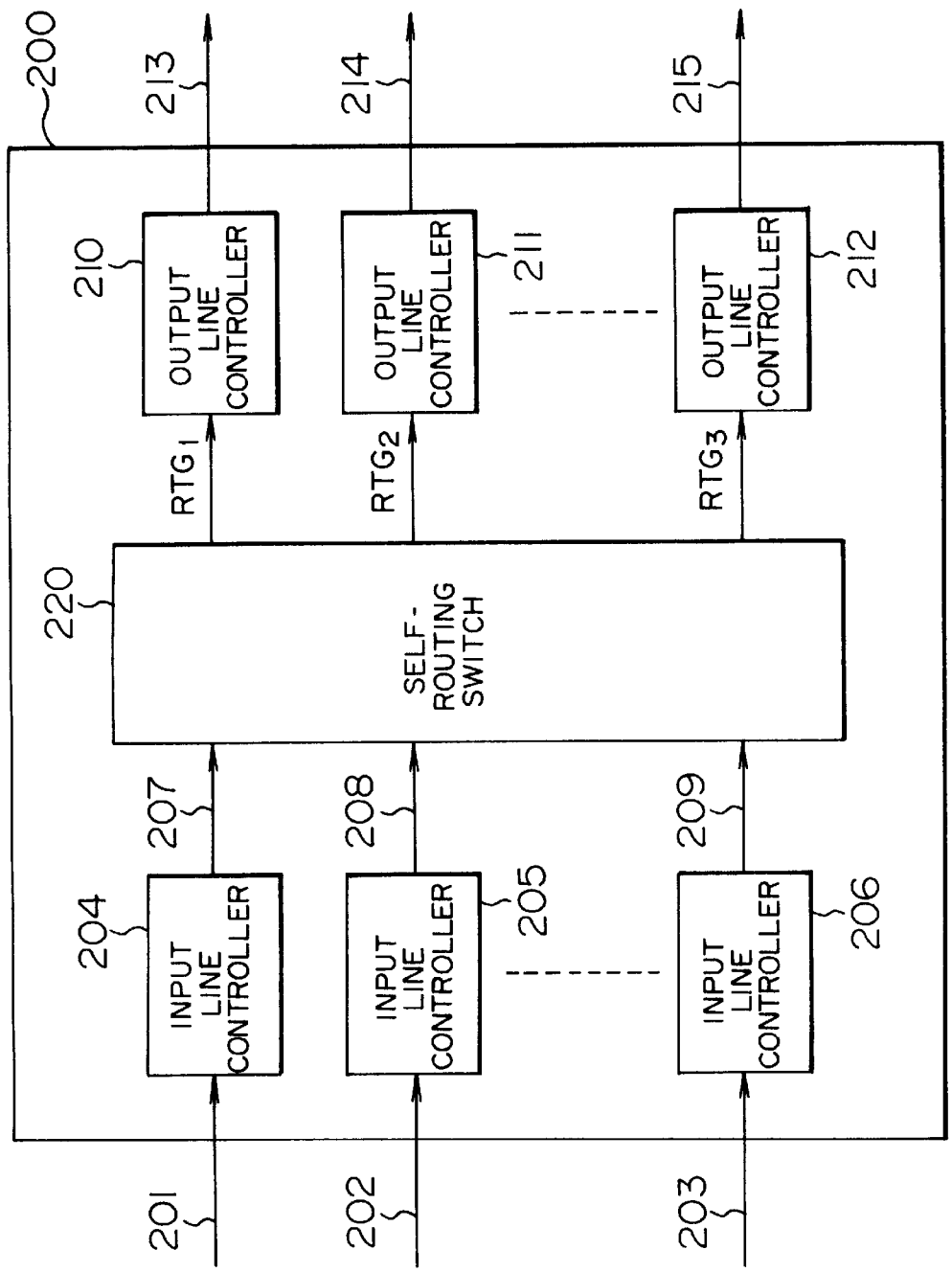
FIG. 20 is a block diagram showing the overall construction of an ATM communication apparatus presupposed by the present invention.

In an ATM communication apparatus 200 constructed as shown in FIG. 20, input lines 201, 202 and 203 and output lines 213, 214 and 215 are connected to another ATM communication apparatus to perform transmission and reception of an ATM cell.

Each transmission line contains a plurality of virtual paths and each virtual path contains a plurality of virtual channels. For identification of a virtual path and a virtual channel, an ATM cell to be transferred on a transmission line contains a virtual path identifier (VPI) and a virtual channel identifier (VCI).

An input line controller 204, 205 or 206 extracts information, necessary for selection of an output line, from VPI and VCI numbers of an ATM inputted from the input line 201, 202 or 203 and performs conversion of the VPI and VCI numbers. Then, the input line controller 204, 205 or 206 delivers to internal interface 207, 208 or 209 of system the ATM cell which is added with internal routing information of system (RTG) provided for efficiently performing selection of an output line.

A self-routing switch 220 analyzes the RTG of the ATM cell received from the internal interface 207, 208 or 209 of system and selects a route to an output line controller 210, 211 or 212 inserted in the output line 213, 214 or 215.

By providing pieces of the internal routing information (RTG) of system by the number corresponding to the number of lines contained in the ATM communication apparatus, the analysis time can be shortened and the scale of an analysis circuit can be reduced than in the case where VPI and VCI are analyzed to perform route selection. The internal routing information of system is described in detail in U.S. Pat. No. Re. 34,305 (corresponding to JP-A-2-1669) the disclosure of which is hereby incorporated by reference.

The output line controller 210, 211 or 212 deletes the internal routing information (RTG) of system from the ATM cell received from the self-routing switch 220 and delivers a resulting ATM cell to the output line 213, 214 or 215.

Figures 21, 22, 23:
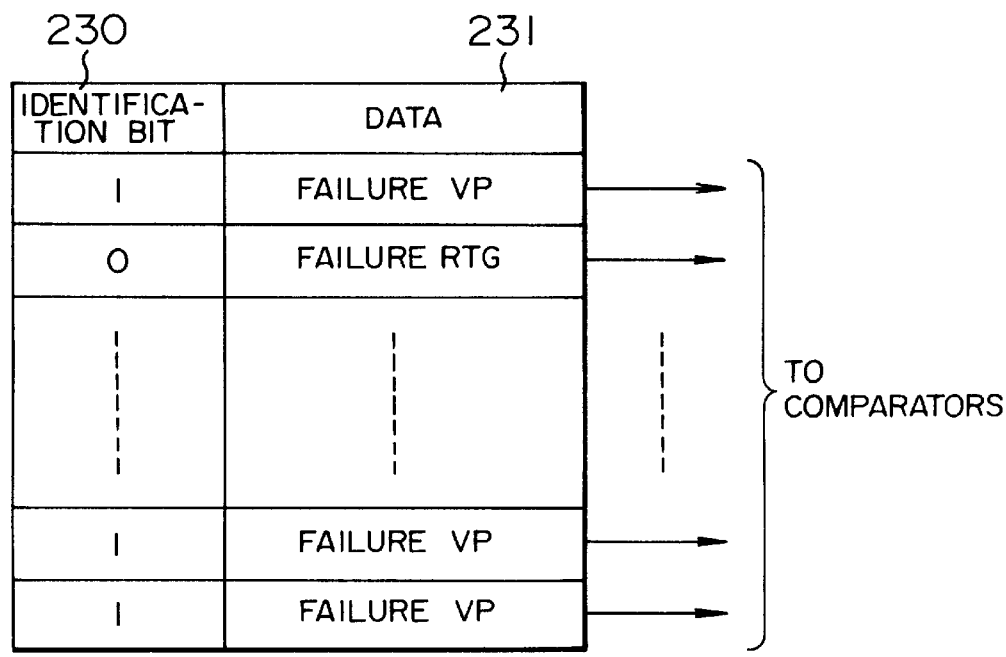
FIG. 21 is a diagram showing the structure of an AMT cell on a transmission line in the ATM communication apparatus of FIG. 20.
FIG. 22 is a diagram showing the structure of an AMT cell in the ATM communication apparatus of FIG. 20.
FIG. 23 is a diagram showing the construction of a register for failure used in the FIG. 11 embodiment.

FIG. 21 shows the structure of the ATM cell on the transmission line and FIG. 22 shows the structure of the ATM cell in the ATM communication apparatus.

Figure 4:
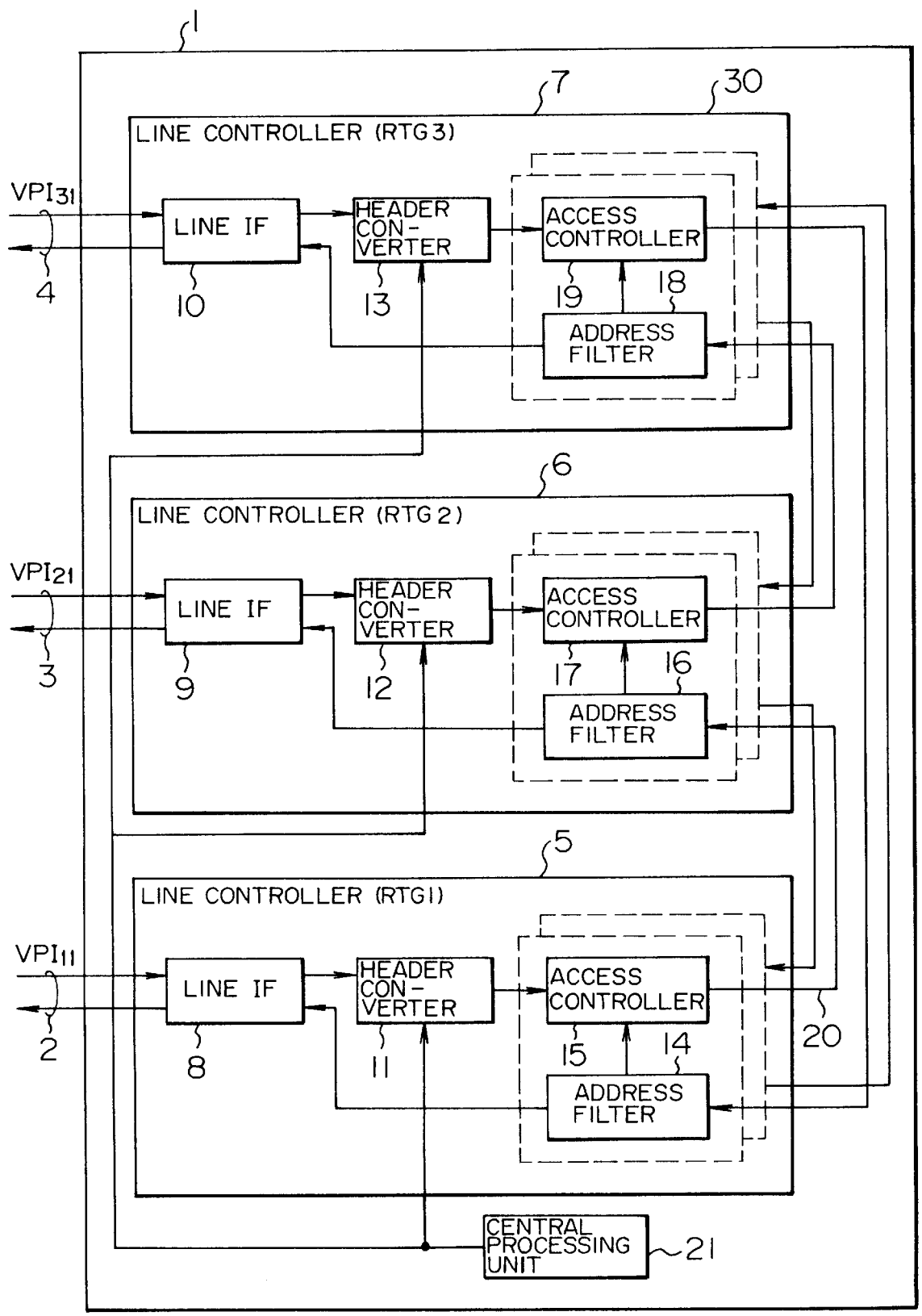
FIG. 4 is a block diagram of an ATM communication apparatus useful to explain the present invention.

FIG. 4 is a block diagram of the ATM communication apparatus, depicting the line controller in the FIG. 20 ATM communication apparatus in greater detail. Referring to FIG. 4, an example of an ATM communication apparatus 1 of the present invention devoid of a path changing system of the present invention will be described.

In the Figure, lines represented by transmission lines 2 to 4 are connected to another ATM communication apparatus to perform transmission and reception of an ATM cell. A line controller 5, 6 or 7 connected to each transmission line is assigned with internal routing information (RTG 1, 2 or 3) of system. Each transmission line contains a plurality of virtual paths, each virtual path is assigned with a virtual path identifier (VPI), output line routing information (output RTG number and output VPI number) corresponding to an input VPI number written at the VPI is determined by a central processing unit 21, and the output line routing information is transferred to the line controller so as to be stored in a header converter inside the line controller.

An ATM cell inputted from the transmission line 2 (VPI 11) and destined for the transmission line 3 (VPI 21) is subjected to interface conversion by means of a line-interface (hereinafter referred to as a line IF) 8 standing for an interface which terminates the line inside the line controller 5 and thereafter output line routing information (RTG 2 and VPI 21) are extracted by means of a header converter 11 on the basis of the input VPI 11 so that the inputted ATM cell may be converted into an ATM cell added with the output line routing information in place of the input VPI 11. The thus converted ATM cell is transmitted to an internal bus 20 of system through an access controller 15 for controlling the timing of transmission to the internal bus of system.

In the line controller 6, on the other hand, the ATM cell inputted from the internal bus 20 of system is subjected to a comparison in which internal routing information of system of the inputted ATM cell is compared with internal routing information of system assigned to the line controller. When the two pieces of information coincide with each other, the ATM cell destined for the transmission line 3 and monitored by an address filter 16 for transmission of the inputted ATM cell to the line IF is extracted and internal routing information of system (RTG 2) is deleted, with the result that the ATM cell is transmitted to the transmission line 3 through a line IF 9.

In the event that a failure occurs in the transmission line 3, failure information is transferred from the line controller 6 to the central processing unit 21, which recognizes the failure in the transmission line 3. The central processing unit 21 identifies a line controller dealing with a call connected to the transmission line 3 (line controller 5 in the present case) and transfers changed output line routing information (RTG 3 and VPI 31) to that line controller.

Figure 5:
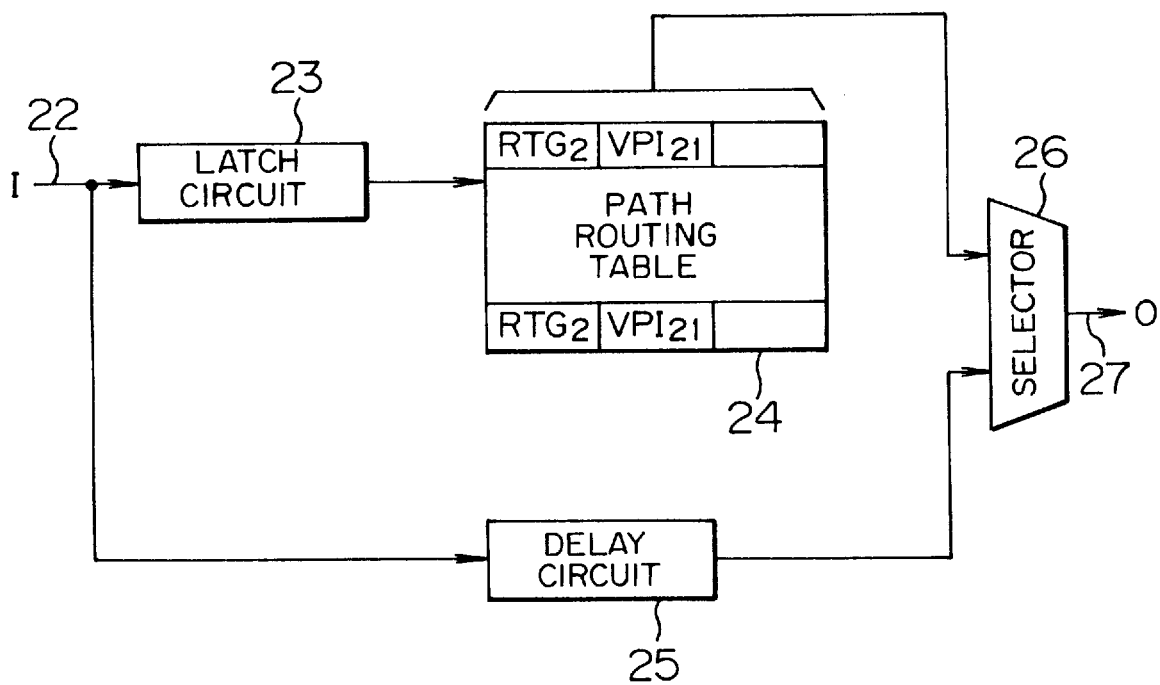
FIG. 5 is a block diagram of a header converter circuit in the FIG. 4 ATM communication apparatus.
Figure 6:
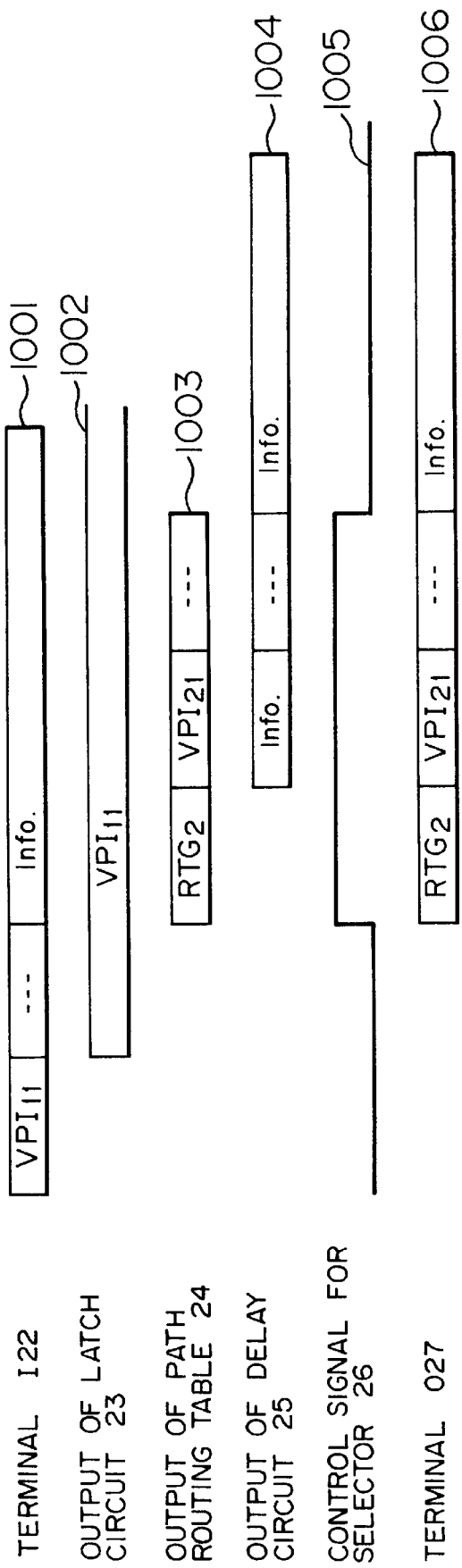
FIG. 6 is a time chart for explaining the operation of the FIG. 5 circuit.

FIG. 5 shows the circuit construction of header converters 11, 12 or 13 inside the line controllers 5, 6 or 7 in the ATM communication apparatus shown in FIG. 4, and FIG. 6 is a time chart for explaining the operation of the circuit shown in FIG. 5. An ATM cell from the input line is applied to a latch circuit 23 and a delay circuit 25 through a terminal I 22 (1001 in FIG. 6). The latch circuit 23 latches a VPI number of the input ATM cell. An output of the latch circuit 23 (1002 in FIG. 6) is connected to a routing table 24 and the contents of the routing table corresponding to the VPI number of the input ATM cell is read (1003 in FIG. 6). The contents of the routing table 24 contains output line routing information and is set by the central processing unit 21 as described in connection with FIG. 4. The output line routing information read out of the routing table 24 is applied to a selector 26. The selector 26 transmits the contents of the routing table to a terminal O 27 for a period of transmission of the output line routing information but transmits an output of the delay circuit 25 to the terminal O 27 for the other period (1005 and 1006 in FIG. 6). The delay circuit 25 is adapted to delay the ATM cell for a time beginning with the application of the ATM cell to the header converter and ending with the delivery of the adding output line routing information from the selector 26 (1004 in FIG. 6).

Through the operation described as above, the input ATM cell is converted into an ATM cell added with the output line routing information.

Figure 17:
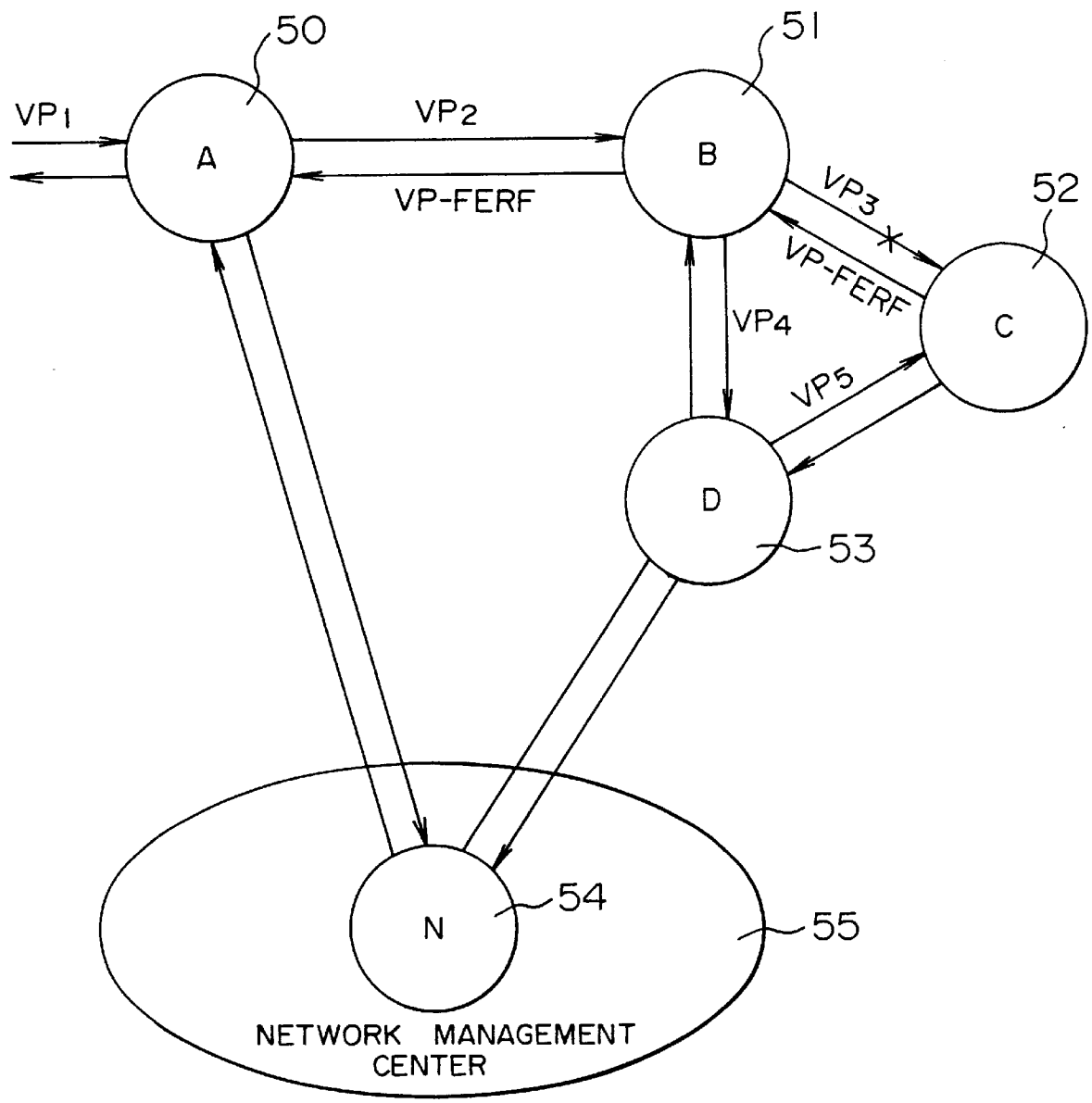
FIG. 17 is a diagram showing the construction of a conventional network in which a plurality of ATM communication apparatus are managed centrally by a network management center.

Turning to FIG. 17, the operation of a conventional ATM communication network in which a plurality of ATM communication apparatus are managed centrally by means of a network management center.

In FIG. 17, ATM communication apparatus A 50, B 51, C 52 and D 53 are managed centrally by a network management center 55 including an ATM communication apparatus N 54. Only the ATM communication apparatus A 50 and D 53 are connected directly to the ATM communication apparatus N 54. In the ATM communication apparatus, VP information is converted from an input VP to an output VP. For example, it is now assumed that a VP 1 received by the ATM communication apparatus A 50 reaches the ATM communication apparatus C 52 through the ATM communication apparatus B 51 (converted to VP 2 and then VP 3). At that time, in the event that a failure occurs in a transmission line between the ATM communication apparatus B 51 and the ATM communication apparatus C 52, VP-FERF serving as failure information is transmitted from ATM communication apparatus C 52 to ATM communication apparatus B 51. Responsive thereto, VP-FERF serving as alarm information is transmitted from ATM communication apparatus B 51 to ATM communication apparatus A 50. The failure is transferred to the network management center 55 through the ATM communication apparatus D 53. In this case, in order to take an alternating transmission line for the failure transmission line between the ATM communication apparatus B 51 and C 52, the ATM communication apparatus N 54 of the network management center 55 must analyze the failure information and thereafter transfer information about the alternating to header converter tables of the ATM communication apparatus B 51 and D 53.

Embodiments of path changing method and system according to the present invention will now be described in greater detail.

Figure 1:
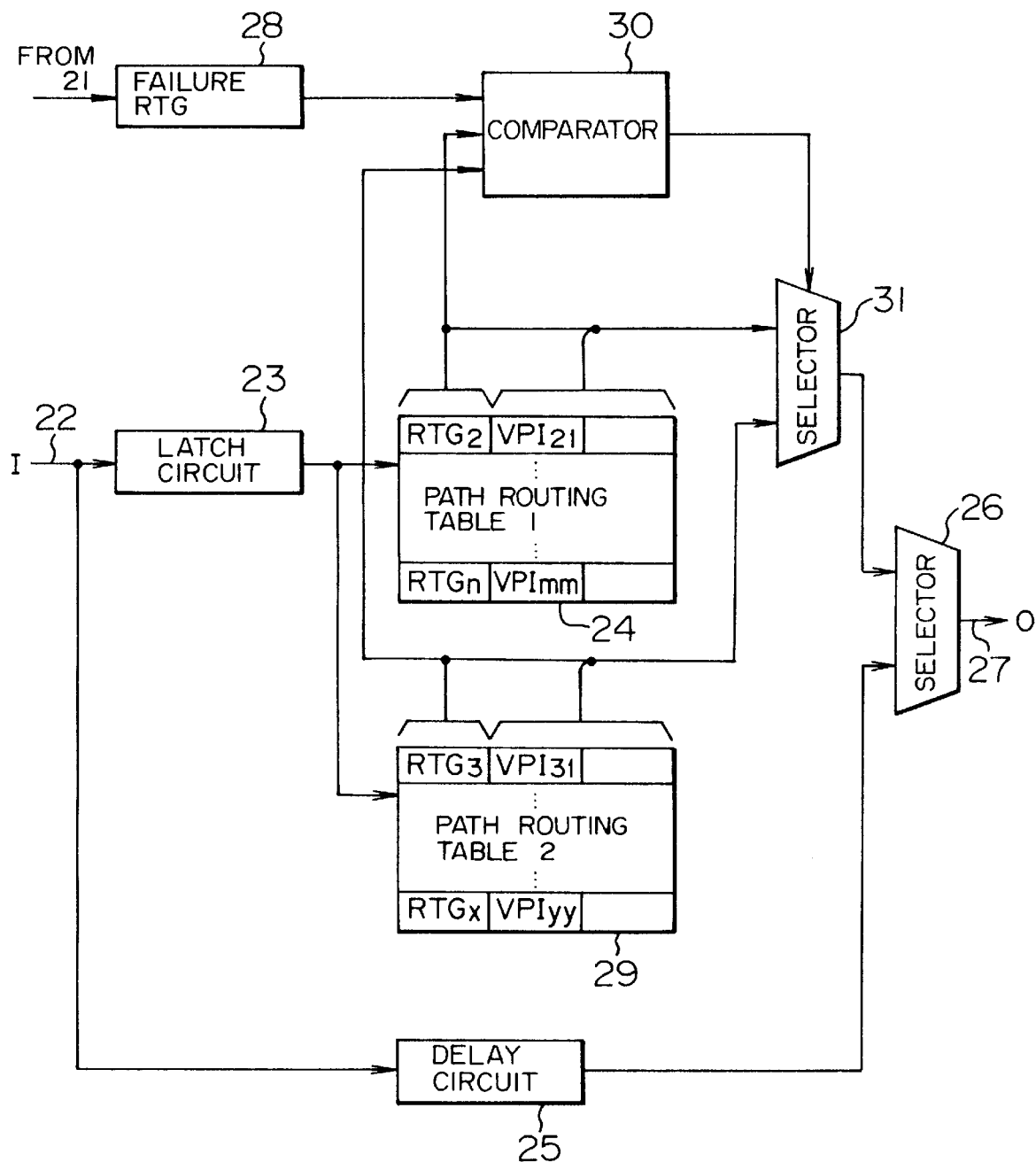
FIG. 1 is a block diagram showing the circuit construction of a first embodiment of a header converter in a line controller in a path changing system according to the present invention.
Figure 2:
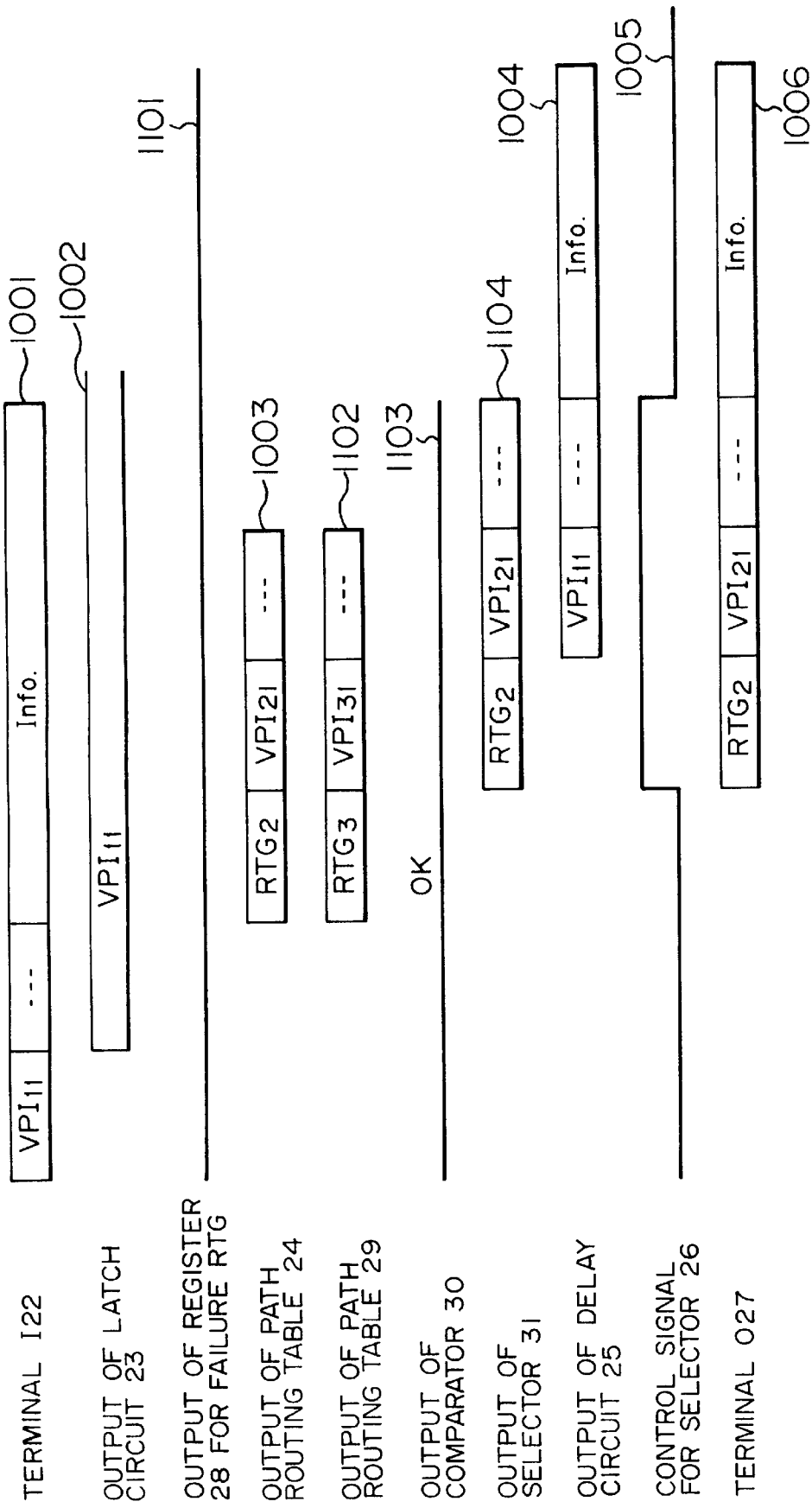
FIG. 2 is a time chart for explaining the operation of the FIG. 1 circuit (in the absence of any failure in a transmission line).

FIG. 1 shows a first circuit construction of a header converter used in the line controller of an ATM communication apparatus to realize a path changing method according to an embodiment of the present invention. FIG. 2 is a time chart for explaining the operation of the circuit shown in FIG. 1 (in the absence of any failure in a transmission line), and FIG. 3 is a time chart for explaining the operation of the circuit shown in FIG. 1 (in the presence of a failure in a transmission line).

The circuit shown in FIG. 1 adds to the circuit shown in FIG. 5 a register 28 for failure RTG for storing internal routing information of system corresponding to a failure transmission line when a failure occurs in the transmission line under the direction of the central processing unit 21 or a failure processor inside the line controller 5, 6 or 7, a comparator 30 for comparing the contents of the register 28 for failure RTG with internal routing information of system contained in output line routing information read out of routing tables 24 and 29, the second routing table 29 being adapted to store output line routing information of an alternating transmission line when a failure occurs in the transmission line, and a selector 31 for selecting the contents of the second routing table 29 in place of the contents of the first routing table 24 in the event of the occurrence of a failure in the transmission line.

Figure 3:
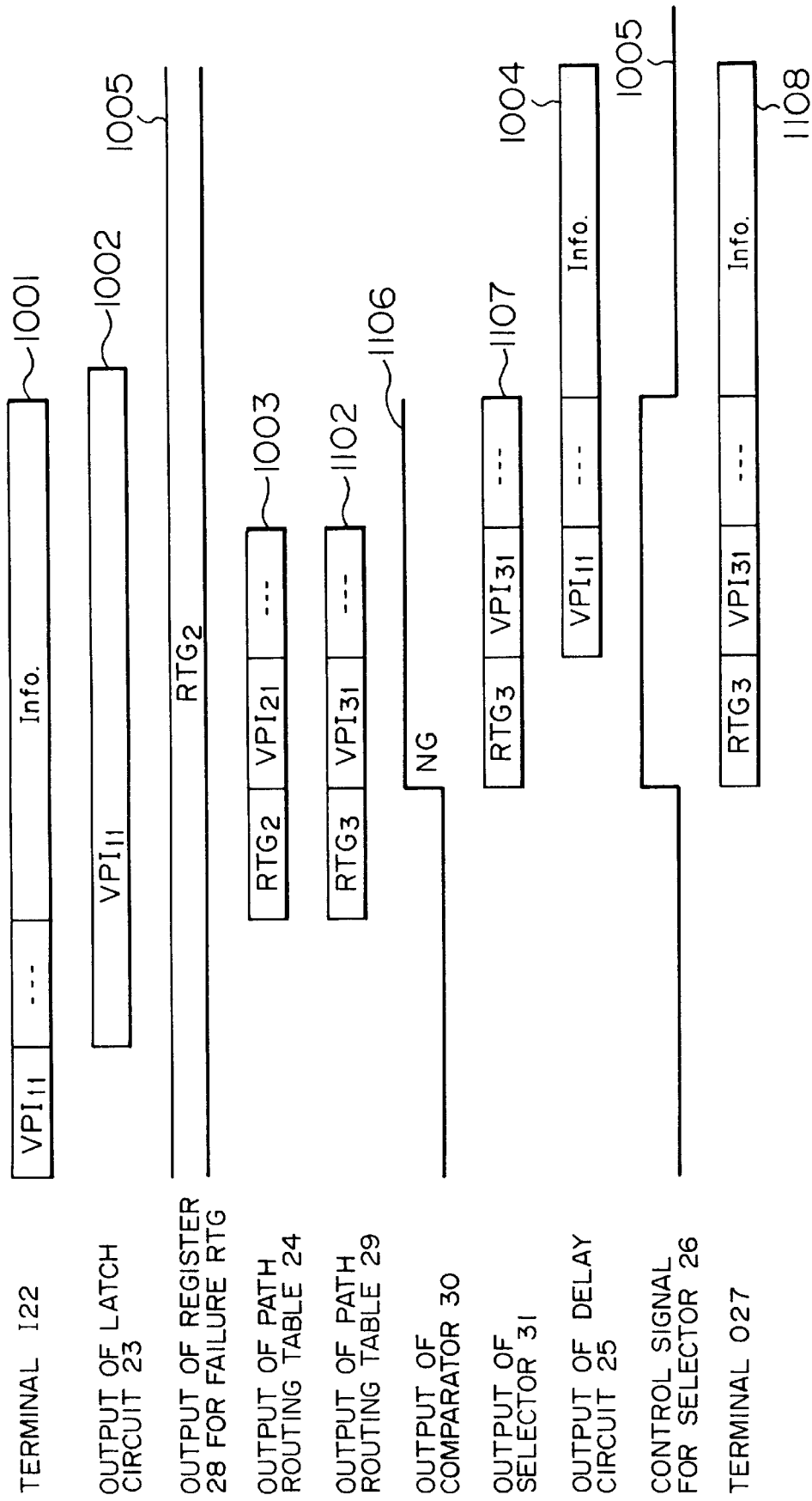
FIG. 3 is a time chart for explaining the operation of the FIG. 1 circuit (in the presence of a failure in a transmission line).

An output of latch circuit 23 (1002 in FIG. 2 and 1002 in FIG. 3) is also connected to the second routing table 29 to read the contents of the first and second routing tables 24 and 29 simultaneously (1003 and 1102 in FIG. 2 and 1003 and 1102 in FIG. 3). Pieces of internal routing information of system in the contents read out of the first and second routing tables 24 and 29 are also applied to the comparator 30 so as to be compared thereby with internal routing information of system inputted from the register 28 for failure RTG.

The output of comparator 30 is connected to the selector 31 and functions to cause the selector 31 to select the contents of the first routing table 24 when two inputs to the comparator 30, that is, the output of register 28 and the output of the table 24 do not coincide with each other (1103 and 1104 in FIG. 2) but to cause the selector 31 to select the contents of the second routing table 29 when the two inputs to the comparator 30 coincide with each other (1106 and 1107 in FIG. 3). Accordingly, in the absence of any failure in an output line corresponding to an input ATM cell, the contents of the first routing table 24 is transmitted to the selector 26 (1104 in FIG. 2) but in the presence of a failure in the output line corresponding to the input ATM cell, the contents of the second routing table 29 is transmitted to the selector 26 (1107 in FIG. 3).

The selector 26 is operative to transmit the output of the selector 31 to the terminal O 27 for a period during which the output routing information is added to the input ATM cell and transmit the output of the delay circuit 25 to the terminal O 27 for the other period (1005 and 1006 in FIG. 2 and 1005 and 1108 in FIG. 3). The delay circuit 25 is adapted to delay the input ATM cell for a time beginning with the application of the ATM cell to the header converter and ending with the delivery of the adding output routing information from the selector 26.

Through the above operation, in the event of the occurrence of a failure in a transmission line, an ATM cell scheduled to be delivered to that transmission line is delivered to an alternating transmission line instead simultaneously with setting of the register 28 for failure RTG, thereby permitting high-speed changing of transmission line.

Figure 7:
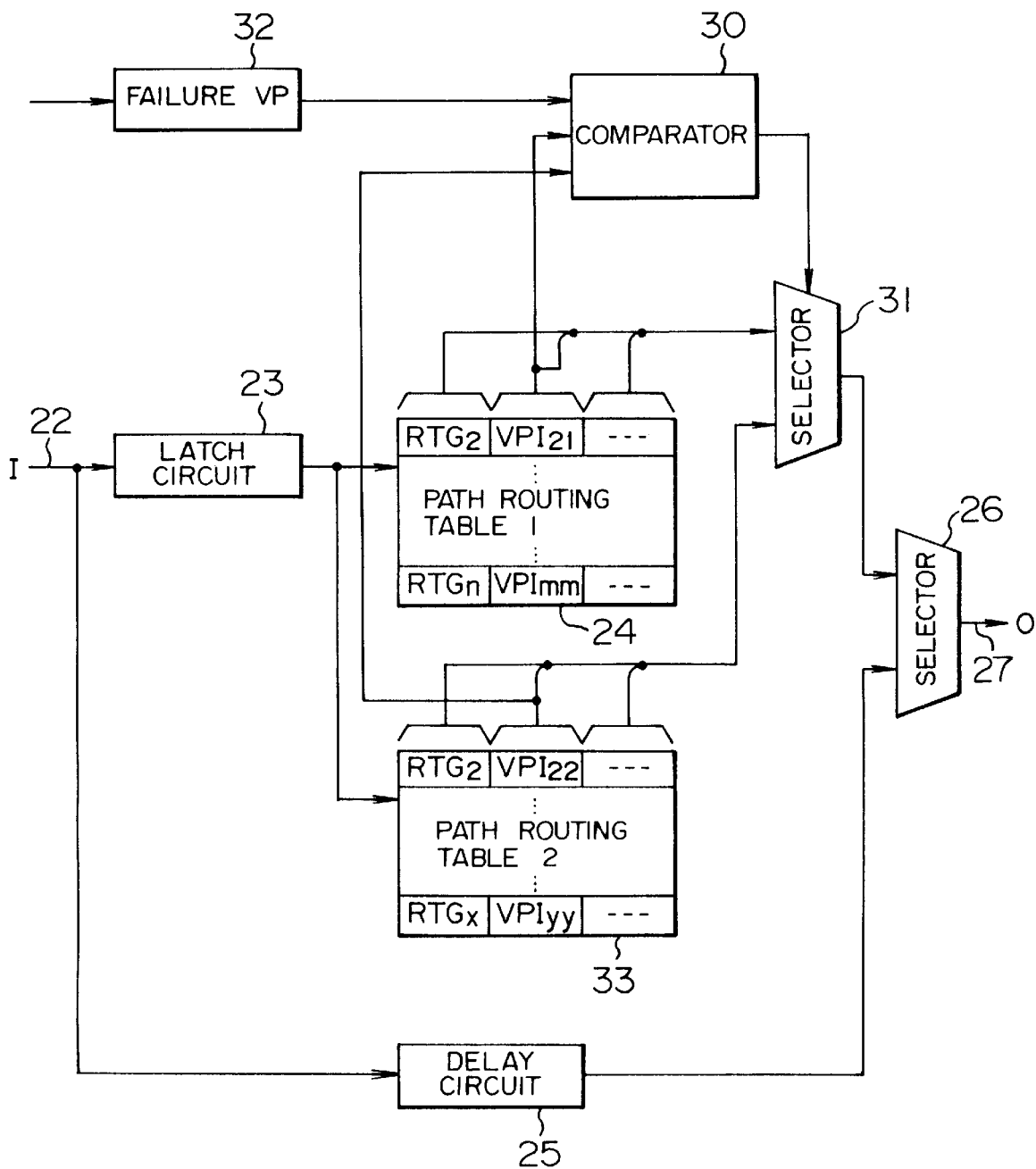
FIG. 7 is a block diagram showing the circuit construction of a second embodiment of the header converter in the line controller in the path changing system according to the present invention.
Figure 8:
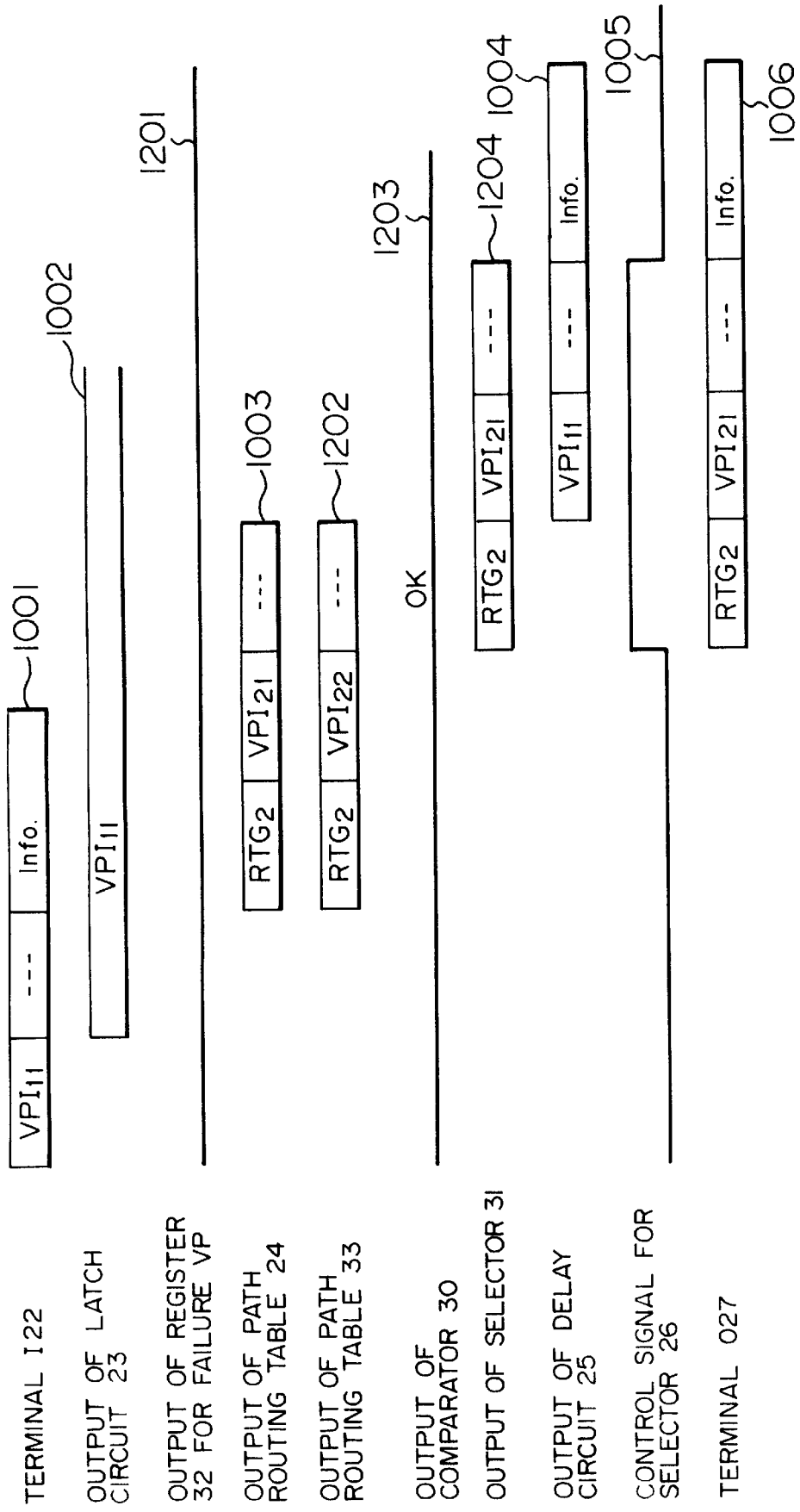
FIG. 8 is a time chart for explaining the operation of the FIG. 7 circuit (in the absence of any failure in a virtual path).

FIG. 7 shows a second circuit construction of the header converter inside the line controller for realization of the path changing method and system in the ATM communication apparatus according to the present invention. FIG. 8 is a time chart for explaining the operation of the circuit shown in FIG. 7 (in the absence of any failure in a virtual path) and FIG. 9 is a time chart for explaining the operation of the circuit shown in FIG. 7 (in the presence of a failure in a virtual path).

The circuit shown in FIG. 7 adds to the circuit shown in FIG. 5 a register 32 for failure VP for storing a VPI number corresponding to a virtual path suffering a failure when the failure occurs in that virtual path, a comparator 30 for comparing the contents of the register 32 for failure VP with a VPI number contained in output line routing information read out of routing tables 24 and 33, the second routing table 33 being adapted to store output line routing information of an alternating virtual path when a failure occurs in that virtual path, and a selector 31 for selecting the contents of the second routing table 33 in place of the contents of the first routing table 24 in the event of the occurrence of a failure in a transmission line.

Figure 9:
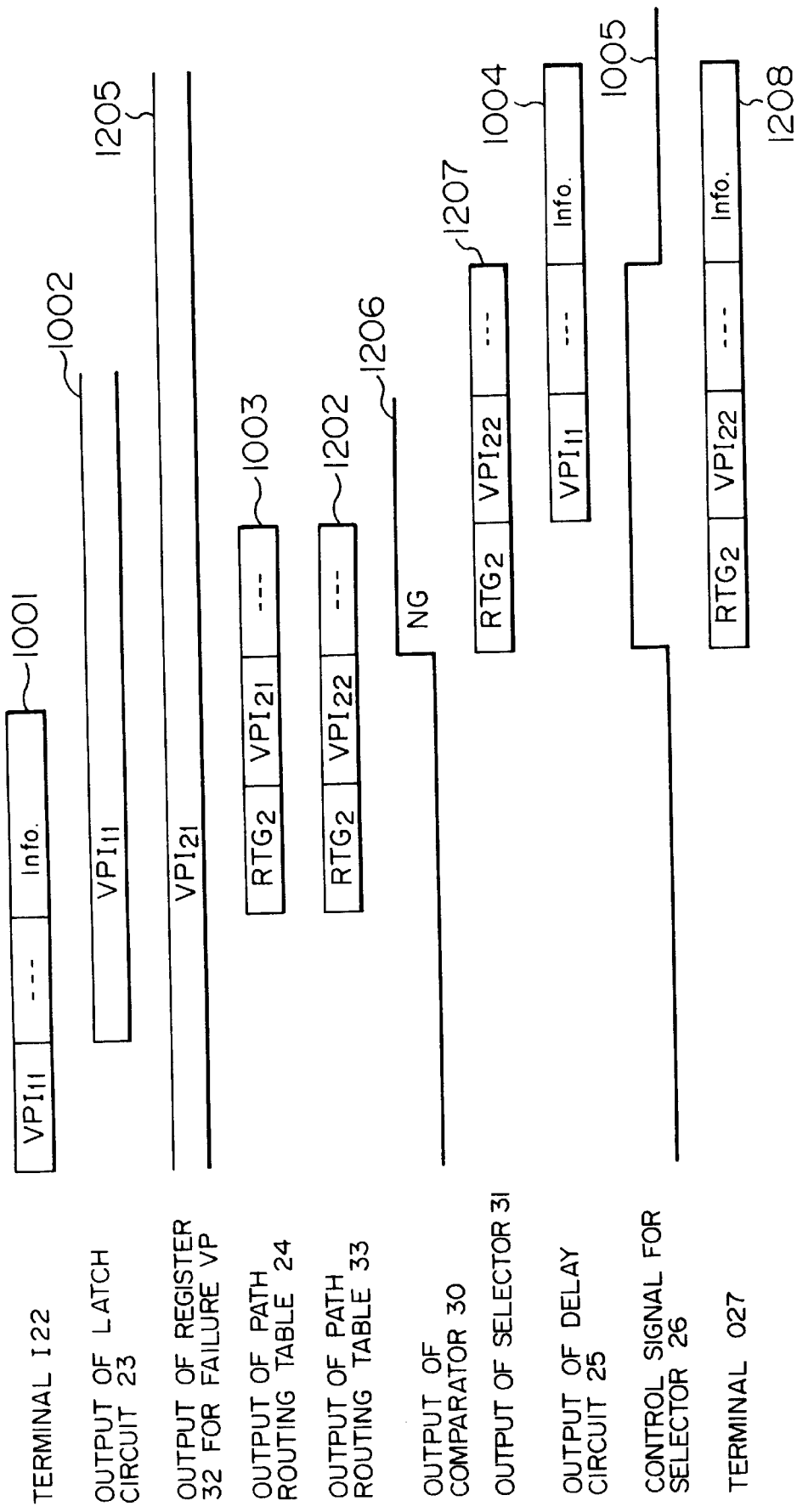
FIG. 9 is a time chart for explaining the operation of the FIG. 7 circuit (in the presence of a failure in a virtual path).

An output of latch circuit 23 (1002 in FIG. 8 and 1002 in FIG. 9) is also connected to the second routing table 33 to read the contents of first and second routing tables 24 and 33 simultaneously (1003 and 1202 in FIG. 8 and 1003 and 1202 in FIG. 9). VPI numbers in the contents read out of the first and second routing tables 24 and 33 are also applied to the comparator 30 so as to be compared thereby with the VPI number supplied from the register 32 for failure VP.

The output of comparator 30 is connected to the selector 31 and functions to cause the selector 31 to select the contents of the first routing table 24 when two inputs to the comparator 30, that is, the output of register 32 and the output of the table 24 do not coincide with each other (1203 and 1204 in FIG. 8) but to cause the selector 31 to select the contents of the second routing table 33 when the two inputs to the comparator 30 coincide with each other (1206 and 1207 in FIG. 9). Accordingly, in the absence of any failure in an output virtual path corresponding to the input ATM cell, the contents of the first path routing table 24 is transmitted to the selector 26 (1204 in FIG. 8) but in the presence of a failure in the output virtual path corresponding to the input ATM, the contents of the second routing table 33 is transmitted to the selector 26 (1207 in FIG. 9).

The selector 26 is operative to transmit the output of the selector 31 to the terminal O 27 for a period during which the output routing information is added to the input ATM cell and transmits the output of the delay circuit 25 to the terminal O 27 for the other period (1005 and 1006 in FIG. 8 and 1005 and 1208 in FIG. 9). The delay circuit 25 is adapted to delay the ATM cell for a time beginning with the application of the ATM cell to the header converter and ending with the delivery of the adding output routing information from the selector 26. In this manner, in the event of the occurrence of a failure in a virtual path, an ATM cell scheduled to be delivered to that virtual path is delivered to an alternating virtual path simultaneously with setting of the register 32 for failure VP, thereby permitting high-speed changing of path.

Figure 10:
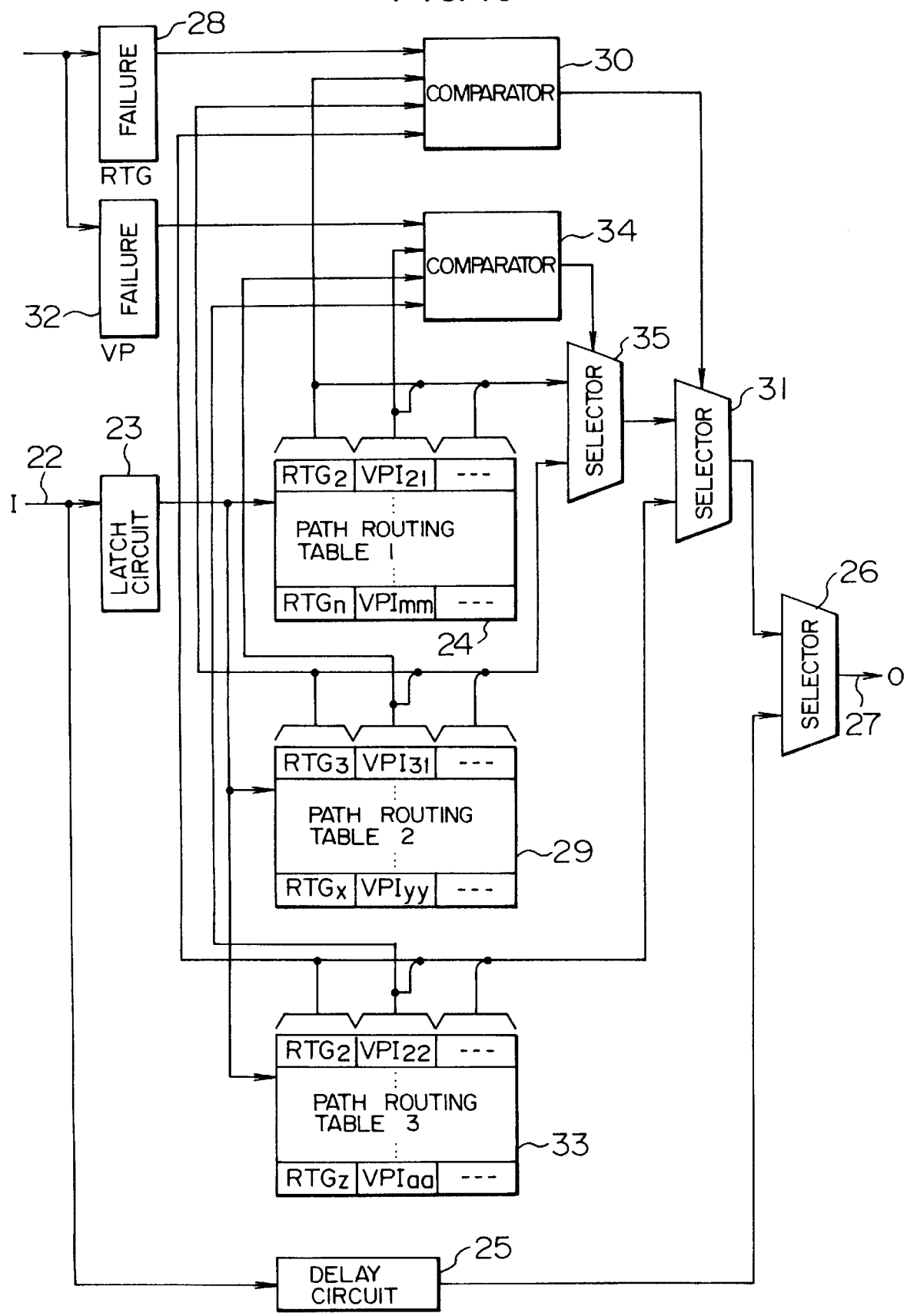
FIG. 10 is a block diagram showing the circuit construction of a third embodiment of the header converter in the line controller in the path changing system according to the present invention.

FIG. 10 shows a third circuit construction of header converter which adds to the FIG. 1 circuit a register 32 for failure VP, a comparator 34, a selector 35 and a third path routing table 33 and in this construction, VPI numbers contained in pieces of output line information read out of the routing tables 24, 29 and 33 are applied to the comparator 34. With this circuit construction, alternating in a unit of virtual path can be ensured in the event of a virtual path failure and alternating in a unit of transmission line can be ensured in the event of a transmission line failure as shown in the time charts of FIGS. 2, 3, 8 and 9.

Figure 11:
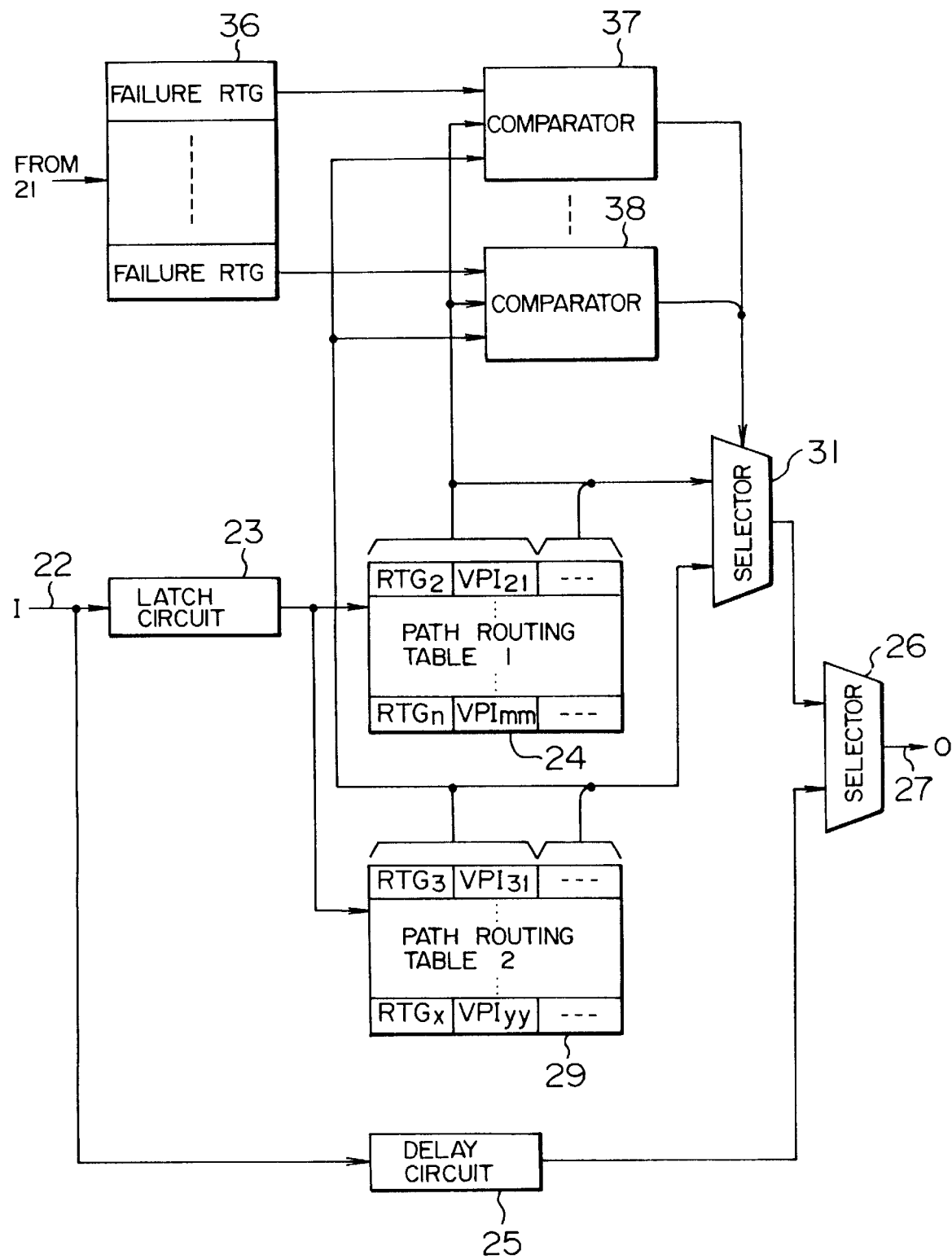
FIG. 11 is a block diagram showing the circuit construction of a fourth embodiment of the header converter of the line controller in the path changing system according to the present invention.

The FIG. 7 header converter circuit can be modified as shown in FIG. 11 to provide a fourth circuit construction of header converter wherein a register 36 for failure is provided which is constructed by assembling a plurality of registers for failure VP and registers for failure RTG to add to the register for failure VP the function of the register for failure RTG shown in FIG. 1, the thus constructed register is applied with an identification bit (identifier) used to determine which of virtual path and transmission line a failure belongs to, and comparators 37 and 38 respond to this bit to determine an object to be compared which is either internal routing information of system in output line routing information read out of the routing tables 24 and 29 or a VPI number read out of the routing tables 24 and 29. This construction permits alternating in a unit of virtual path in the event of a virtual path failure and alternating in a unit of transmission line in the event of a transmission line failure; and besides permits alternating even in the event that failures occur in a plurality of transmission lines or virtual paths.

FIG. 23 is a diagram showing the construction of the register 36 used in the FIG. 11 circuit construction. In the Figure, when the identification bit 230 has a value of "1", the value of data 231 shows a failure VP and when the identification bit has a value of "0", the value of data 231 shows a failure RTG.

Figure 12:
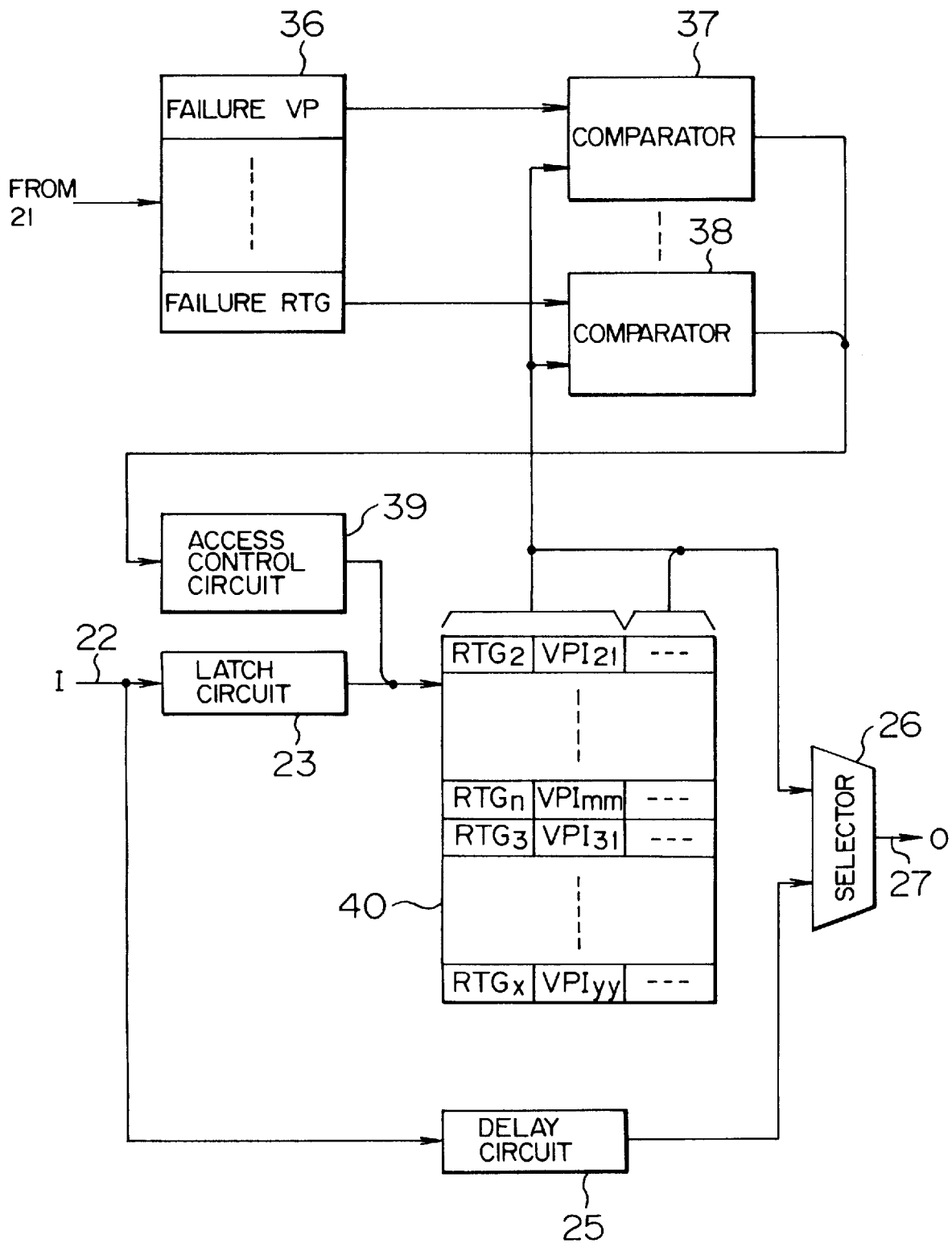
FIG. 12 is a block diagram showing the circuit construction of a fifth embodiment of the header converter in the line controller in the path changing system according to the present invention.
Figure 15:
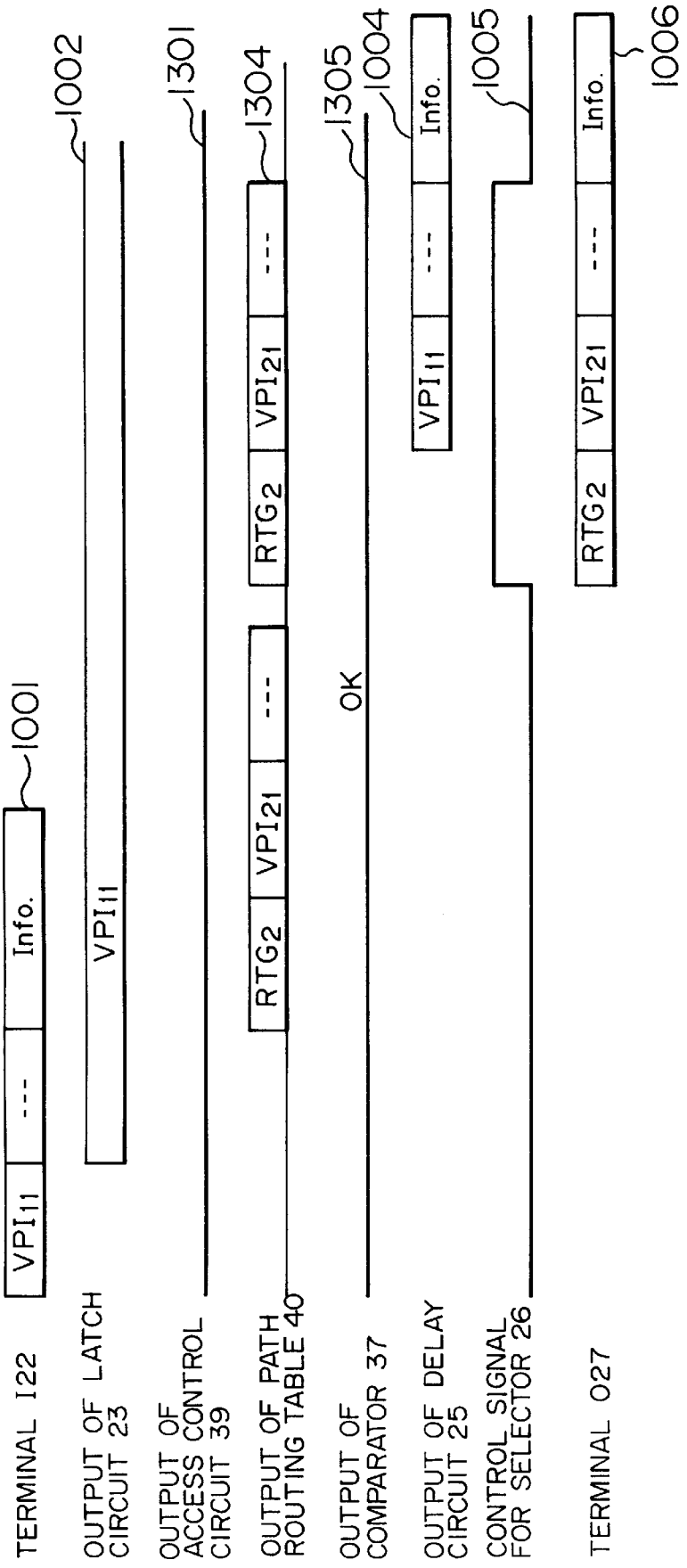
FIG. 15 is a time chart for explaining the operation of the FIG. 12 circuit (in the absence of any failure in a transmission line or a virtual path).

The FIG. 11 header converter circuit can be modified as shown in FIG. 12 to provide a fifth circuit construction of header converter wherein the first and second routing tables 24 and 29 are united into a routing table 40. FIGS. 13A and 13B show memory maps 41 and 42 of the routing tables 24 and 29 shown in FIG. 11, respectively, and FIG. 14 shows a memory map 43 of the routing table 40 shown in FIG. 12. FIG. 15 is a time chart in the absence of any failure occurring in a transmission line or a virtual path and FIG. 16 is a time chart in the presence of a failure occurring in a transmission line or a virtual path.

Figure 16:
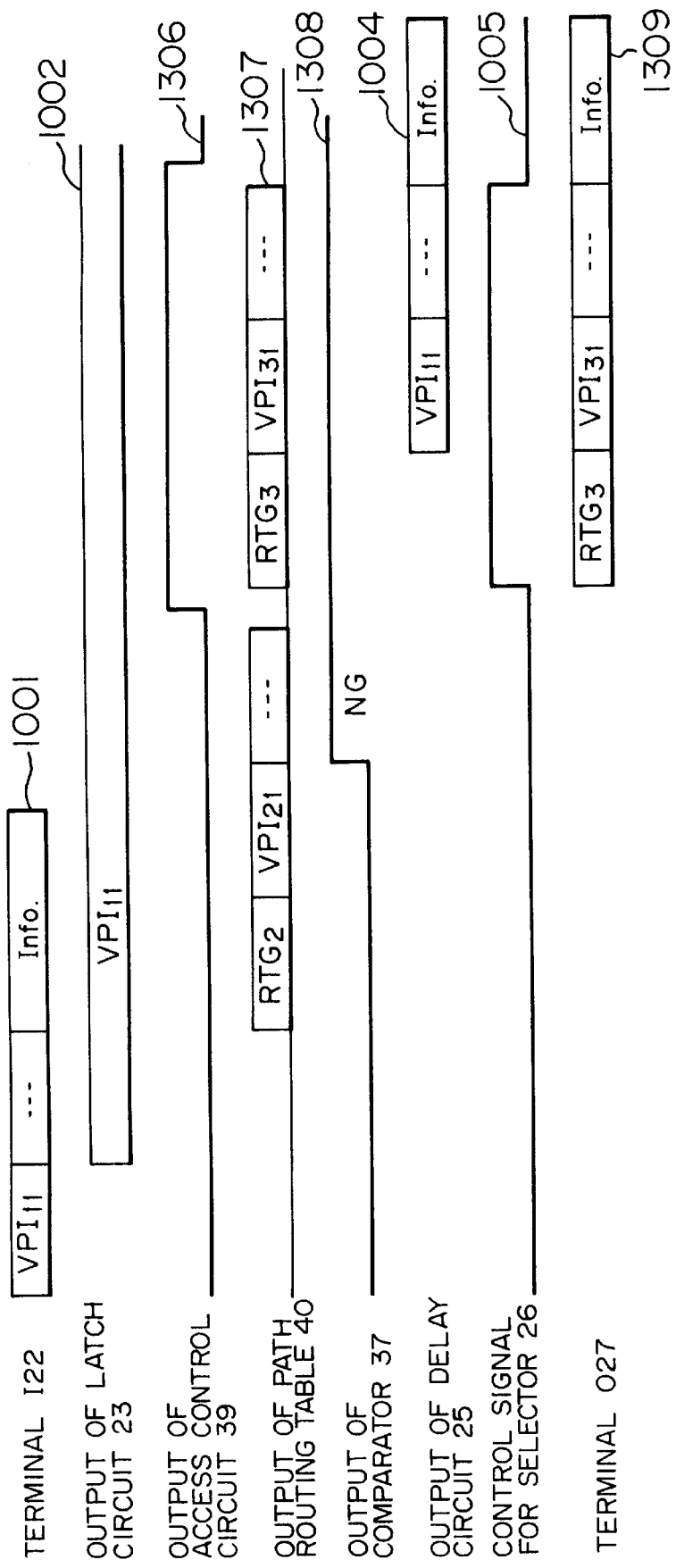
FIG. 16 is a time chart for explaining the operation of the FIG. 12 circuit (in the presence of a failure in a transmission line or a virtual path).

In FIG. 12, an access control circuit 39 for controlling reading of the routing table 40 controls the routing table 40 in such a manner that output line routing information corresponding to the first routing table 24 shown in FIG. 11 is read out during a first operation of reading the routing table 40 and during a second operation of reading the routing table 40, the output line routing information corresponding to the first routing table 24 is again read out when any inputs to the comparators 37 and 38 do not coincide with a failure VP or a failure RTG (1301 and 1304 in FIG. 15) but output line routing information corresponding to the second routing table 29 shown in FIG. 11 is read out when coincidence of any inputs to the comparators 37 and 38 with a failure VP or RTG occurs (1306 and 1307 in FIG. 16). This construction, like the circuit shown in FIG. 11, permits alternating in a unit of virtual path in the event of a virtual path failure or alternating in a unit of transmission line in the event of a transmission line failure and besides it permits alternating even when failures occur in a plurality of transmission lines or virtual paths. Further, the circuit construction shown in FIG. 12 can reduce the number of data lines of the routing table to ½ of that in the circuit shown in FIG. 11 and eliminate one selector, thus making it possible to provide a more economical circuit.

Referring to FIG. 18 and FIGS. 19A to 19F, an embodiment of the path changing method according to the present invention when a plurality of ATM communication apparatus constitute a network.

Figure 18:
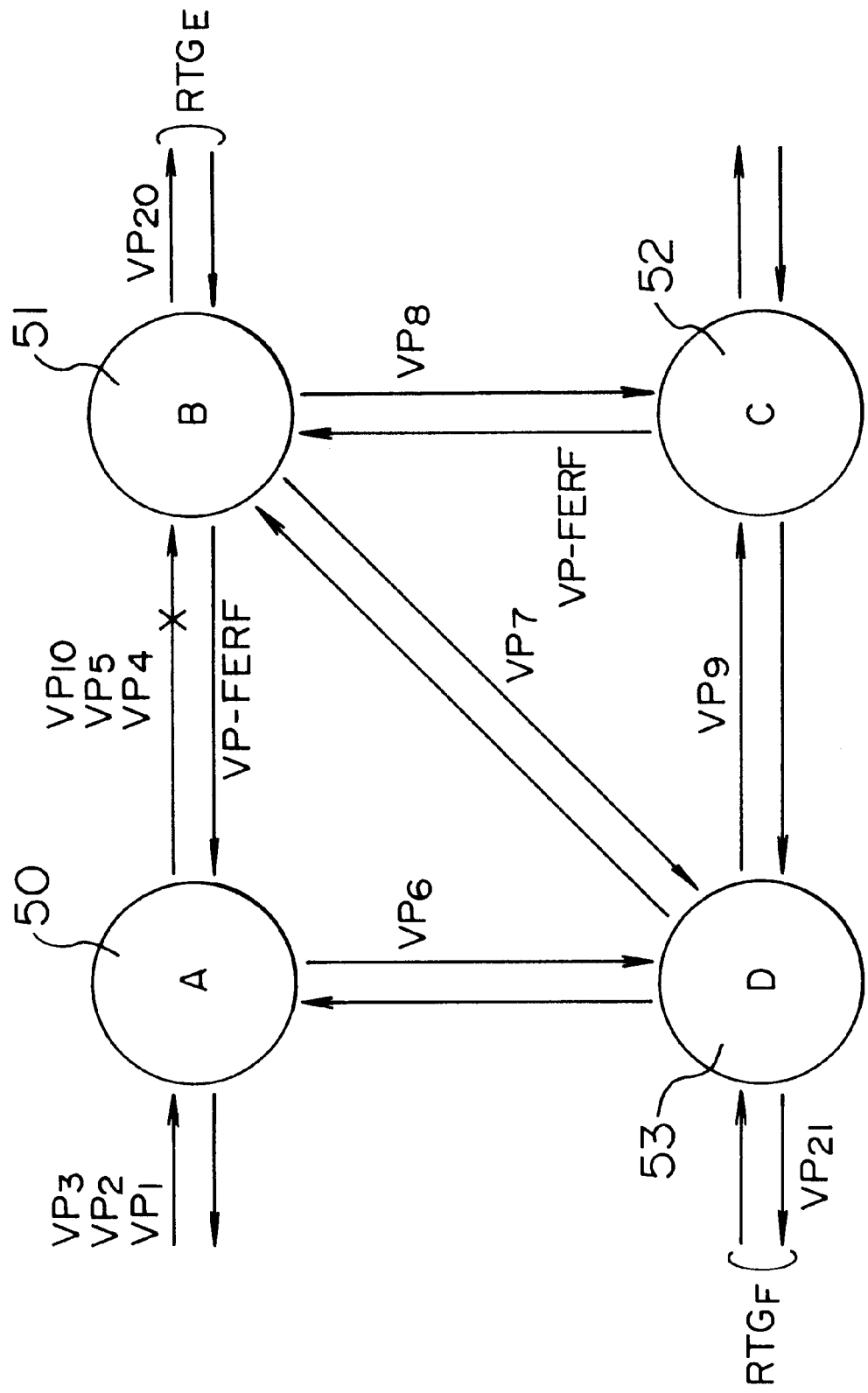
FIG. 18 is a diagram showing the construction of a network comprised of a plurality of ATM communication apparatus according to the present invention.

FIG. 18 is a diagram showing a network constructed of ATM communication apparatus A 50, B 51, C 52 and D 53. As to VP information used herein, an input VP is converted into an output VP inside each ATM communication apparatus. For example, a VP1 received by the ATM communication apparatus A 50 reaches the ATM communication apparatus C 52 through the ATM communication apparatus B 51 (converted from VP4 to VP 8), a VP2 received by the ATM communication apparatus A 50 is converted into a VP5 which in turn reaches the ATM communication apparatus B 51 and a VP3 received by the ATM communication apparatus A 50 is converted into a VP6 which in turn reaches the ATM communication apparatus D 53. In the network shown in FIG. 18, in the absence of a failure in any transmission lines or VP's, the first routing table is selected as the header converter table in all of the ATM communication apparatus A 50, B 51 C 52 and D 53 as shown in the memory maps of FIGS. 19A to 19F. At that time, in the event that a failure occurs in a transmission line between the ATM communication apparatus B 51 and C 52, the ATM communication apparatus C 52 transmits to the ATM communication apparatus B 51 a VP-FERF standing for failure information. When the central processing unit of the ATM communication apparatus B 51 receives the VP-FERF indicative of the failure transmission line, it sets internal routing information of system corresponding to that transmission line, that is, a failure RTG number (in this case, RTG=C) in the register for failure. As shown in the memory maps of FIGS. 19A to 19F, the second routing table is selected as the header converter table of the ATM communication apparatus B 51 when VP4 is received and RTG and VP assume D and 7, respectively, so that the VP1 received by the ATM communication apparatus A 50 reaches the ATM communication apparatus C 52 through the ATM communication apparatus B 51 and D 53 (converted from VP4 to VP7 and then to VP 9). In this manner, there is no need of rewriting the contents of the header converter table and consequently the path can be changed at a high speed. In the network shown in FIG. 18, in the event that a failure occurs in a path VP4 in the transmission line between the ATM communication apparatus A 50 and B 51, VP-FERF standing for failure information is transmitted from the ATM communication apparatus B 51 to the ATM communication apparatus A 50. When the central processing unit of the ATM communication apparatus A 50 receives the VP-FERF of the failure path, it sets internal routing information of system corresponding to that path, that is, a failure VP number (in this case VP=4) to the register for failure. As shown in the memory maps of FIGS. 19A to 19E, the second routing table is selected as the header converter table of the ATM communication apparatus A 50 when the VP1 is received and RTG remains to be B but VP assumes 10, so that the VP1 received by the ATM communication apparatus A 50 reaches the ATM communication apparatus C 52 through the ATM communication apparatus B 51 (converted from VP10 to VP8).

According to the present invention, in the event that a transmission line failure or a VP failure occurs, the transmission line or path changing processing is not carried out by the central processing unit but is effected in self-control fashion by the hardware installed in each line responding portion and hence changing can be completed in a short period of time even in a network and a system having no emergency transmission lines. In other words, a high-speed path changing system capable of reducing the path disconnection time can be realized and therefore highly reliable, highly economical and highly serviceable ATM communication network and ATM communication apparatus can be provided.

According to the present invention, even in the case where the transmission line is not duplex and in the case where a communication network is constructed in which a plurality of ATM communication apparatus are managed centrally by a network management center, hardware installed in each line responding portion performs the transmission line or path changing processing in self-control fashion without resort to much rewrite of the output path routing table of each ATM communication apparatus by means of the network management center and therefore the path changing can be completed instantaneously and the reliability of the whole of the network can be improved.

What is claimed is:

1. An ATM communication apparatus comprising a plurality of input lines and a plurality of output lines which transfers a received ATM cell from one of the input lines to one of the output lines based on a destination identifier included in a header part of the received ATM cell, comprising:

a plurality of memories, each of which stores routing information, corresponding to the received destination identifier, indicating one of the output lines through which the received ATM cell is to be transmitted, and a new destination identifier of an ATM cell, corresponding to the received destination identifier, to be transferred from said one of the output lines;

a switch which transfers the received ATM cell to said one of the output lines based on the routing information;

a register which stores either a status of said one of the output lines or a status of an apparatus connected to said one of the output lines, or both;

a controller which selects one of the memories, rewrites the received destination identifier to the new destination identifier stored in said one of the memories, and controls the transferring of the received ATM cell to the one of said output lines based on the routing information stored in the one of the memories.

2. An ATM communication apparatus according to claim 1, wherein each of said plurality of memories store either different information corresponding to the destination identifier of the received ATM cell or a new destination identifier corresponding to the destination identifier of the received ATM cell, or both, wherein said received ATM cell is transferred such that said controller selects either the output line or the destination identifier of said received ATM cell, or both, in accordance with said status of said one of the output lines or said status of an apparatus connected to said one of the output lines.

3. An ATM communication apparatus comprising a plurality of input lines and a plurality of output lines which transfers a received ATM cell from one of the input lines to one of the output lines based on a destination identifier included in a header part of the received ATM cell, comprising:

a plurality of memories, each of which stores routing information, corresponding to the received destination identifier, indicating one of the output lines through which the received ATM cell is to be transmitted, and a new destination identifier of an ATM cell, corresponding to the received destination identifier, to be transferred from said one of the output lines;

a switch which transfers the received ATM cell to said one of the output lines based on the routing information;

a register which stores either a status of said one of the output lines or a status of an apparatus connected to said one of the output lines, or both;

a comparator which compares contents of said register with contents of said memories;

a selector which selects one of said memories based on an output of said comparator; and a controller which rewrites the received destination identifier to the new destination identifier stored in the selected memory, and adds the routing information stored in the selected memory to the received ATM cell.

4. An ATM communication apparatus according to claim 3, wherein each of the memories stores either different routing information corresponding to the received destination identifier or a new destination identifier corresponding to the received destination identifier or both, wherein said received ATM cell is transferred such that said controller selects either the output line of the received ATM cell or the destination identifier of the received ATM cell, or both, in accordance with the status of said one of the output lines or status of an apparatus connected to said one of the output lines.

5. An ATM communication apparatus comprising a plurality of input lines and a plurality of output lines which transfers a received ATM cell from one of the input lines to one of the output lines based on a destination identifier included in a header part of the received ATM cell, comprising:

a first memory which stores routing information, corresponding to the received destination identifier, indicating one of the output lines through which the received ATM cell is to be transmitted, and a new destination identifier of an ATM cell, corresponding to the received destination identifier, to be transferred from said one of the output lines;

at least one second memory which stores second routing information, corresponding to the received destination identifier, indicating a different one of the output lines through which the received ATM cell is to be transmitted, and another new destination identifier of an ATM cell, corresponding to the received destination identifier, to be transmitted from said different one of the output lines, said second routing information and another new destination identifier being different from those stored in said first memory;

a switch which transfers the received ATM cell to said one of the output lines based on the routing information stored in said first or second memory;

a register which stores either a status of the one of the output lines or a status of an apparatus connected to said one of the output lines, or both said statuses being received from said apparatus; and a controller which selects one of the first or second memories in accordance with the output of the register, rewrites the received destination identifier to the new destination identifier stored in the selected one of the first and second memories, and controls the transferring the received ATM cell to one of the output lines based on the routing information stored in the selected one of the first and second memories.

6. An ATM communication apparatus according to claim 5, wherein said status information is a VP-FERF signal outputted from said apparatus connected to said one of the output lines.

7. An ATM communication apparatus according to claim 5, wherein said destination identifier includes a VPI specified by the header part of said ATM cell.

8. An ATM communication apparatus comprising a plurality of input lines and a plurality of output lines which transfers a received ATM cell from one of the input lines to one of the output lines based on a destination identifier included in a header part of the received ATM cell, comprising:

a first memory which stores routing information, corresponding to the received destination identifier, indicating one of the output lines through which the received ATM cell is to be transmitted, and a new destination identifier of an ATM cell, corresponding to the received destination identifier, to be transferred from said one of the output lines;

a second memory which stores second routing information, corresponding to the received destination identifier, indicating a different one of the output lines through which the received ATM cell is to be transmitted, and another new destination identifier of an ATM cell, corresponding to the received destination identifier, to be transmitted from said different one of the output lines, said second routing information and another new destination identifier being different from those stored in said first memory;

a switch which transfers the received ATM cell to said one of the output lines based on the routing information stored in said first or second memory; and a controller which selects said first memory when status information received from an apparatus connected to the one of the output lines indicates normality of said one of the output lines or normality of said apparatus connected thereto and selects said second memory when an abnormality is indicated, and rewrites the received destination identifier to the destination identifier stored in the selected one of the first and second memories, and controls the transferring of the received ATM cell to one of the output lines based on the routing information stored in the selected one of the first and second memories.

9. An ATM communication apparatus according to claim 8 wherein said status information is a VP-FERF signal output from said apparatus connected to said one of the output lines.

10. An ATM communication apparatus according to claim 8, wherein said destination identifier includes a VPI specified by the header part of said ATM cell.

11. A cell route selecting method for use in an ATM communication apparatus having a plurality of input lines and a plurality of output lines which transfers a received ATM cell from one of the input lines to one of the output lines based on a destination identifier included in a header part of the received ATM cell, the method comprising the steps of:

setting in advance, in a plurality of memories, a plurality of pairs of routing information, corresponding to the received destination identifier, indicating one of the output lines through which the received ATM cell is to be transmitted, and a new destination identifier of an ATM cell, corresponding to the received destination identifier, to be transferred from said one of output lines;

receiving, by a register, status of said one of the output lines or of an apparatus connected to said one of the output lines;

receiving an ATM cell from one of said input lines;

selecting, from said pairs set in advance, one pair of routing information, corresponding to the received destination identifier and the new destination identifier of an ATM cell to be transferred in accordance with the received destination identifier and the received status of said one of the output lines or of an apparatus connected to said one of the output lines; and transferring the received ATM cell to one of the output lines, by a switch, based on the selected routing information with the destination identifier of the received ATM cell being rewritten to the selected new destination identifier.

12. An ATM communication apparatus comprising a plurality of input lines and a plurality of output lines which transfers a received ATM cell from one of the input lines to one of the output lines based on a destination identifier included in a header part of the received ATM cell, comprising:

a plurality of memories, each of which stores routing information, corresponding to the received destination identifier, indicating one of the output lines through which the received ATM cell is to be transmitted, and a new destination identifier of an ATM cell, corresponding to the received destination identifier, to be transferred from said one of the output lines;

a switch which transfers the received ATM cell to said one of the output lines based on the routing information;

a register which stores either a failure status of said one of the output lines or a failure status of apparatuses connected to said one of the output lines, or both;

a controller which selects one of the memories, rewrites the received destination identifier to the new destination identifier stored in said one of the memories, and controls transferring of the received ATM cell to said one of the output lines based on the routing information stored in said one of the memories, in accordance with the output of the register.

13. An ATM communication apparatus according to claim 12, wherein each of said plurality of memories stores either one of different routing information corresponding to the received destination identifier or a new destination identifier of the received ATM cell corresponding to the received destination identifier, or both, wherein said received ATM cell is transferred such that said controller selects either said one of the output lines of said received ATM cell or the destination identifier of said received ATM cell in accordance with the failure status of the output lines or failure status of apparatuses connected to the output lines.

14. An ATM communication apparatus comprising a plurality of input lines and a plurality of output lines which transfers a received ATM cell from one of the input lines to one of the output lines based on a destination identifier included in a header part of the received ATM cell, comprising:

a plurality of memories, each of which stores either one of routing information, corresponding to the received destination identifier, indicating a different output line through which the received ATM cell is to be transmitted, and a new destination identifier of an ATM cell, corresponding to the received destination identifier, to be transferred from said different output line, or both:

a switch which transfers the received ATM cell to said one of the output lines or to said different output line based on the routing information;

a register which stores either a failure status of the output lines or failure status of apparatuses connected to the output lines, or both;

a controller which selects one of the memories, rewrites the received destination identifier to the new destination identifier stored in said selected one of the memories, and controls the transferring of the received ATM cell to said one of the output lines based on the routing information stored in the selected one of the memories, in accordance with the output of the register.

15. An ATM communication apparatus comprising a plurality of input lines and a plurality of output lines which transfers a received ATM cell from one of the input lines to one of the output lines based on a destination identifier included in a header part of the received ATM cell, comprising:

a plurality of memories, each of which stores routing information, corresponding to the received destination identifier, indicating one of the output lines through which the received ATM cell is to be transmitted, and a new destination identifier of an ATM cell, corresponding to the received destination identifier, to be transferred from said one of the output lines;

a switch which transfers the received ATM cell to said one of the output lines based on the routing information;

a register which stores either a failure status of said one of the output lines or a failure status of apparatuses connected to said one of the output lines, or both;

a comparator which compares contents of said register with contents of said memories;

a selector which selects one of said memories based on an output of said comparator;

a controller which rewrites the received destination identifier to the new destination identifier stored in the selected memory, and adds the routing information stored in the selected memory to the received ATM cell.

16. An ATM communication apparatus according to claim 15, wherein each of the memories stores either different routing information corresponding to the received destination identifier or a new destination identifier corresponding to the received destination identifier or both, wherein said received ATM cell is transferred such that said controller selects either the output line of the received ATM cell or the destination identifier of the received ATM cell, or both, in accordance with the failure status of said one of the output lines or failure status of apparatuses connected to said one of the output lines.

* * * * *

UNITED STATES PATENT AND TRADEMARK OFFICE
CERTIFICATE OF CORRECTION

PATENT NO. : 5,926,456
DATED : July 20, 1999
INVENTOR(S) : M. TAKANO et al

It is certified that error appears in the above-identified patent and that said Letters Patent is hereby corrected as shown below:

On the title page, item (73),

Add assignee --HITACHI COMMUNICATION SYSTEMS, INC., Yokohama, Japan--.

Signed and Sealed this

Seventh Day of March, 2000

Attest:

Attesting Officer

Q. TODD DICKINSON

Commissioner of Patents and Trademarks